(12) United States Patent
Argenbright

(10) Patent No.: US 7,580,877 B1
(45) Date of Patent: Aug. 25, 2009

(54) ONLINE EDUCATIONAL TRUST CREATION AND MANAGEMENT

(76) Inventor: Stephen G. Argenbright, 4510 Druid La., Suite 112, Dallas, TX (US) 75205

( * ) Notice: Subject to any disclaimer, the term of this patent is extended or adjusted under 35 U.S.C. 154(b) by 1554 days.

(21) Appl. No.: 10/045,219

(22) Filed: Nov. 9, 2001

Related U.S. Application Data

(63) Continuation-in-part of application No. 09/910,964, filed on Jul. 20, 2001.

(60) Provisional application No. 60/219,920, filed on Jul. 21, 2000.

(51) Int. Cl.
*G06Q 40/00* (2006.01)

(52) U.S. Cl. .................. 705/36 R; 705/35; 705/37; 705/36 T

(58) Field of Classification Search ............ 705/354, 705/35, 36 R, 36 T, 4, 1, 38, 37, 53, 30; 348/E5.006, 348/E5.008, E7.06, E7.07
See application file for complete search history.

(56) References Cited

U.S. PATENT DOCUMENTS

| | | |
|---|---|---|
| 5,878,405 A | 3/1999 | Grant et al. |
| 5,913,198 A | 6/1999 | Banks |
| 6,064,986 A | 5/2000 | Edelman |
| 6,085,174 A | 7/2000 | Edelman |
| 6,161,096 A | 12/2000 | Bell |
| 6,484,147 B1 | 11/2002 | Brizendine et al. |
| 2002/0035489 A1 | 3/2002 | Herman et al. |
| 2002/0116306 A1 | 8/2002 | Sheem |
| 2003/0055763 A1 | 3/2003 | Linnenbringer et al. |
| 2003/0225692 A1 | 12/2003 | Bosch et al. |
| 2004/0088236 A1 | 5/2004 | Manning |
| 2004/0162775 A1 | 8/2004 | Winklevoss et al. |

OTHER PUBLICATIONS

"InvestmentGifts.com", private communication, Mar. 20, 2000.
"InvestmentGifts.com Project Charter", private communication, May 18, 2000.
"Top 10 Q&As about Upromise", http://www.upromise.com/content/faq/popular/fax.html.
"Upromise—The way to Save for College", http://www.upromise.com/.

*Primary Examiner*—Lalita Hamilton
*Assistant Examiner*—Kelly Campen
(74) *Attorney, Agent, or Firm*—Anderson, Levine & Lintel

(57) ABSTRACT

A system and method for creating and administering trusts over the Internet. A grantor accesses a website over the Internet that is served by a trust account administration server. The server checks the identity and creditworthiness of the grantor, and then establishes a trust account. The trustee and beneficiary of the trust are electronically notified of the trust. A trust account administration server can also electronically notify the beneficiary of any demand rights that arise for gifts to the trust, and can permit distributions of the gifts if exercised. The beneficiary can also set up a family home page, and solicit contributions from friends, family, and other parties, for example on gift-giving events. The trust can include educational accounts, such as Qualified Tuition Plan and Educational Individual Retirement Account accounts.

14 Claims, 10 Drawing Sheets

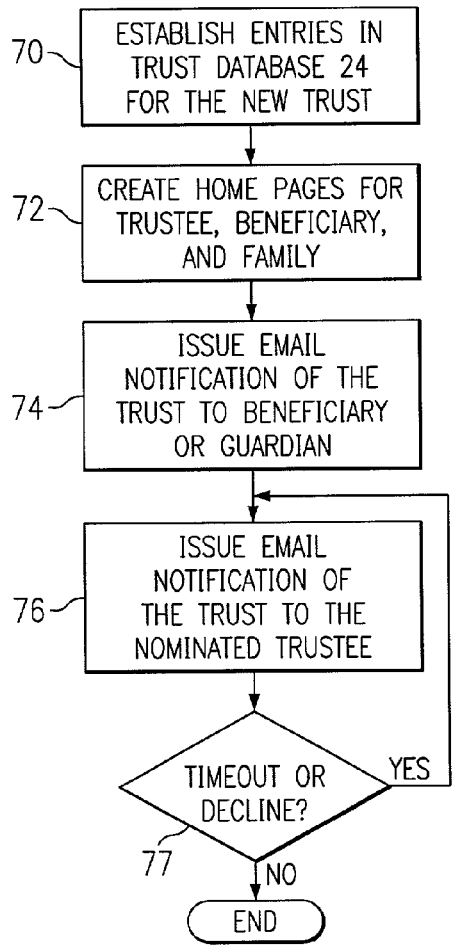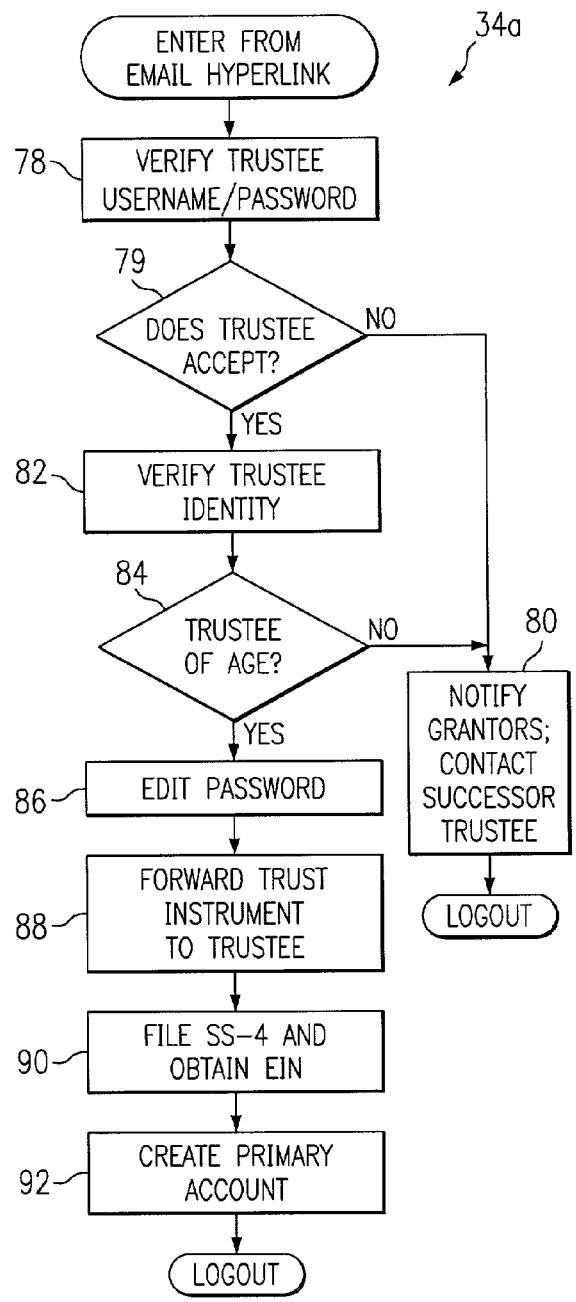

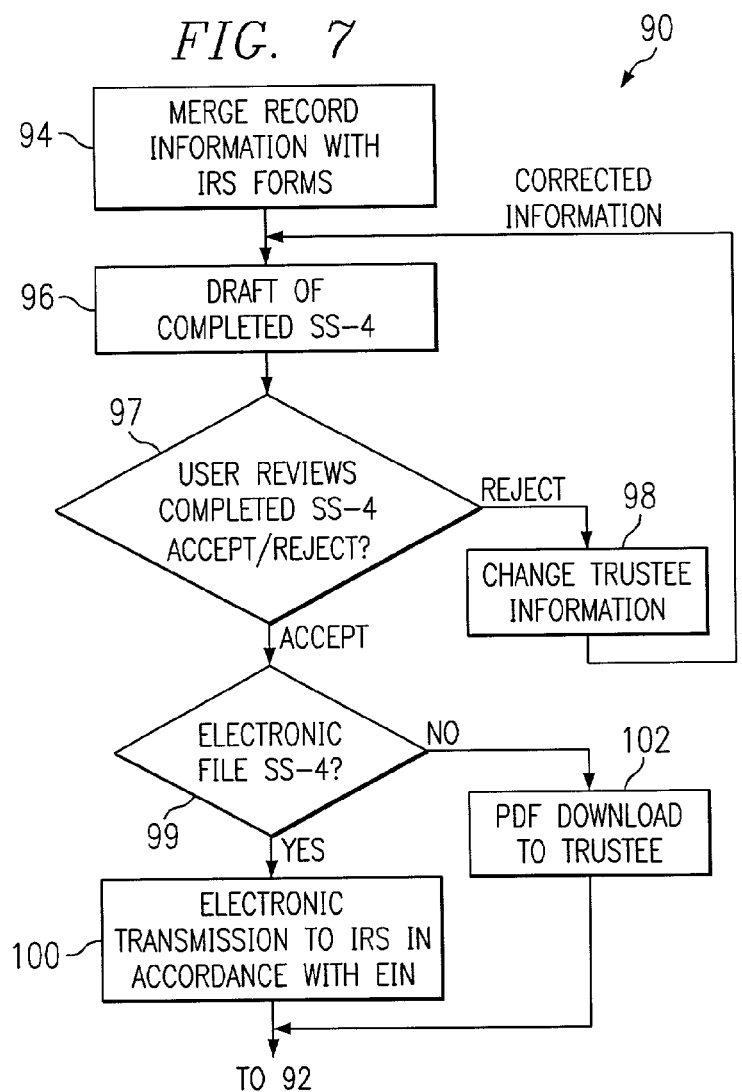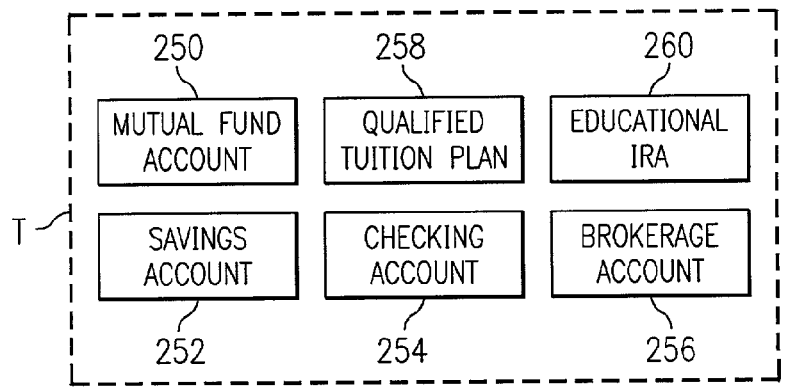

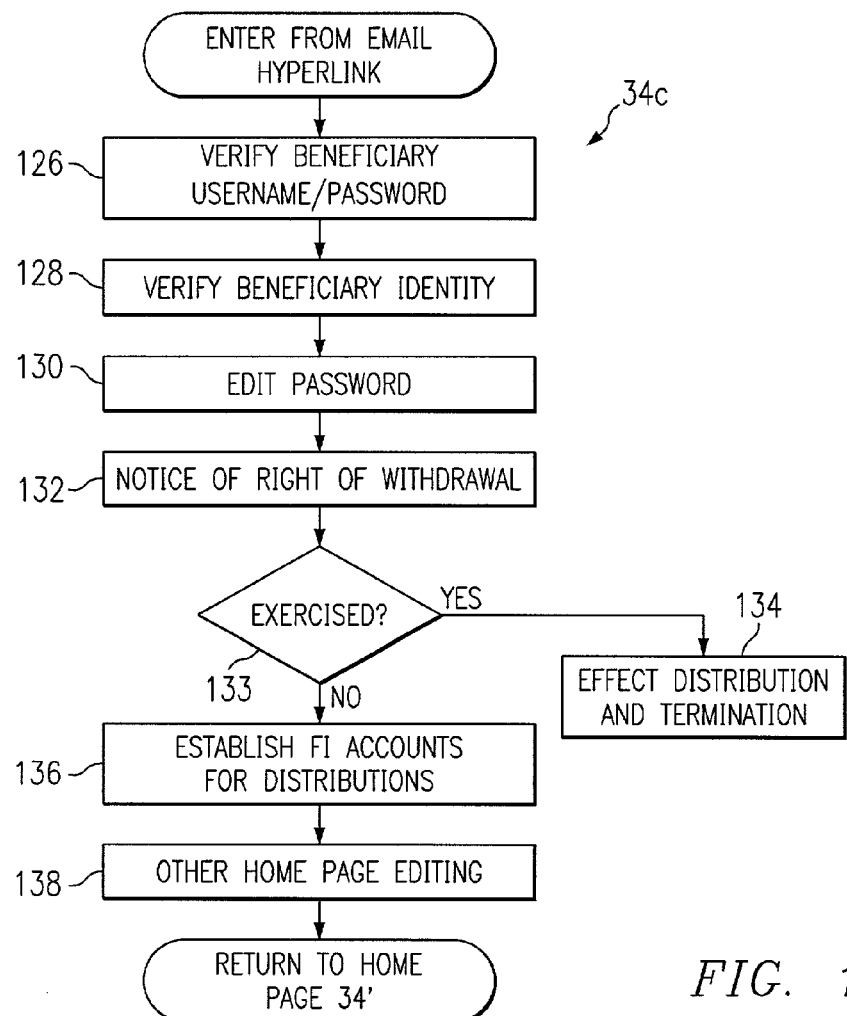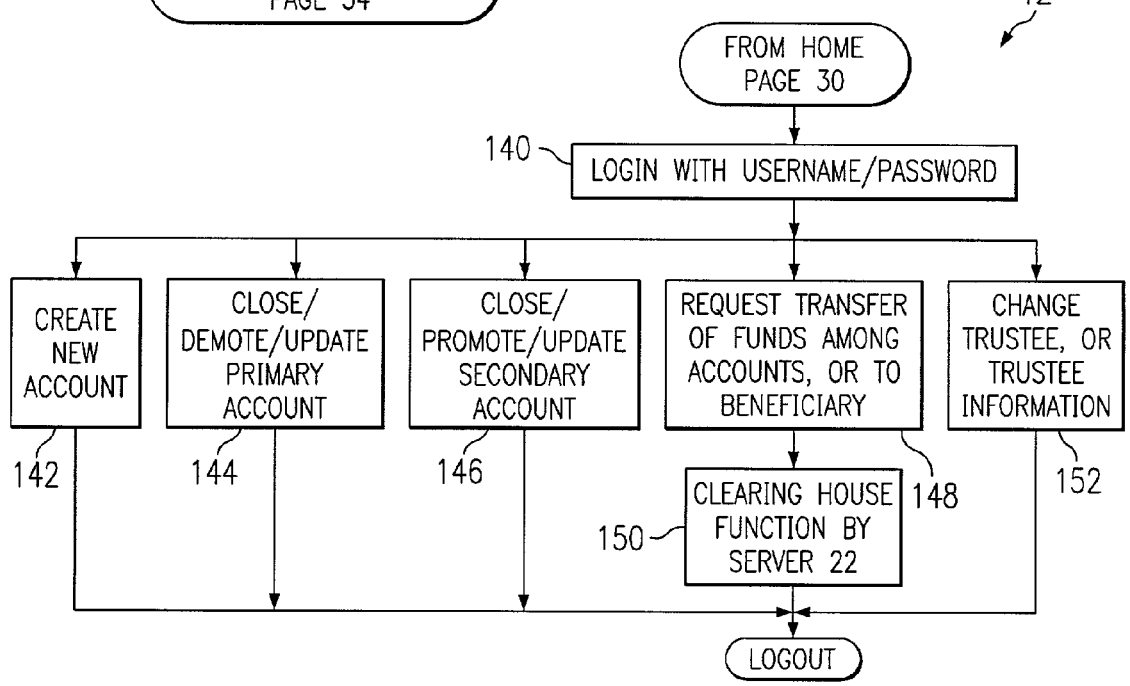

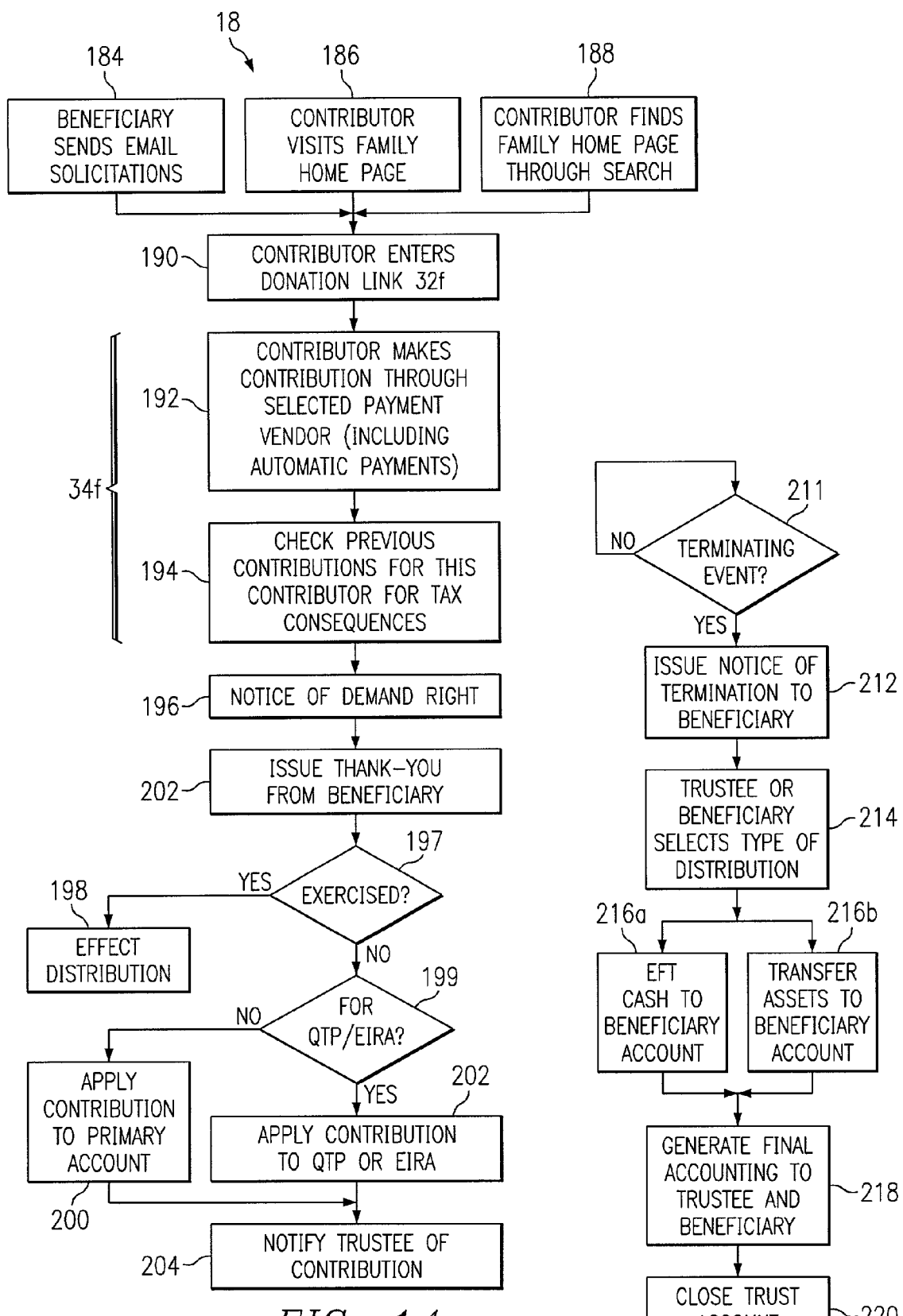

ONLINE EDUCATIONAL TRUST CREATION AND MANAGEMENT

CROSS-REFERENCE TO RELATED APPLICATIONS

This application claims priority, under 35 U.S.C. 5120, and is a continuation-in-part, of application Ser. No. 09/910,964, filed Jul. 20, 2001, which is incorporated herein by this reference, and which claims priority from and incorporates Provisional Application No. 60/219,920, filed Jul. 21, 2000.

STATEMENT REGARDING FEDERALLY SPONSORED RESEARCH OR DEVELOPMENT

Not applicable.

BACKGROUND OF THE INVENTION

This invention is in the field of online financial planning, and is more specifically directed to the creation and management of trusts.

In the field of financial management, trusts are well-known vehicles for providing and managing funds. Fundamentally, a trust is a repository of assets conveyed by one party (the grantor), by way of which another party (the trustee) has legal title and control over the assets in the trust (typically referred to as the body, corpus, or res), on behalf of the beneficiary of the trust, who has equitable title to the trust assets. The trust then can accomplish one or more of the grantor's goals, which can include providing for the management of investments and other assets by a competent trustee, preventing the beneficiary from foolishly spending or wasting the trust assets, preventing creditors and others from accessing the trust property (such a trust typically referred to as a "spendthrift trust"), among others.

Many variations on the fundamental trust are well-known. For example, different beneficiaries may be provided either to share in the entirety of the trust, or in divided interests, for example with one beneficiary having equitable title to trust income with another beneficiary having equitable title to the principal of the corpus. Trusts may be established for a wide range of purposes, such as to provide education and support of minors, to distribute estate property, to maintain a pension or other retirement program on behalf of employees, to provide for living expenses of an elderly grantor by way of a so-called "living trust", and the like. In addition, trusts may either be revocable or irrevocable by the grantor.

The use of trusts to manage and control assets for which the beneficiaries are minor children or young adults is particularly attractive. Control of the assets by a trustee of course reduces the risk of the young beneficiary dissipating the donated assets, especially if the trust is established for a particular purpose (e.g., education) for which the trustee is held accountable.

Trusts can also be used advantageously to shift taxes from a grantor's high tax rate to the lower tax rate of a child. Under current United States tax laws, once a child reaches the age of 14, income from assets given by a parent or grandparent to the child are effectively taxed at the child's tax rate, rather than the parent's or grandparent's rate. Also under current law, a gift of up to $10,000 per year, to an individual donee, may be made without incurring a gift tax, so long as the donee has immediate access to the gift. Therefore, a trust can leverage favorable tax treatment, while still preventing the child from wasting the assets.

The current United States tax laws also distinguish between types of trusts: specifically between grantor trusts, as defined under §§671 through 679 of the United States Internal Revenue Code ("IRC"), and non-grantor trusts. The distinction between these Internal Revenue Service classifications hinge primarily on the type of rights that a grantor and other parties may have under the trust instrument.

A popular trust in the United States is referred to as a Section 2503(c) trust, referring to the governing section of the IRC. Parents can fund a child's Section 2503(c) trust with up to $10,000 per year ($20,000 from a married couple) without incurring gift tax, so long as the trustee is allowed to spend some or all of the trust property for the benefit of the child prior to the child reaching the age of 21, and the remaining trust property is distributed to the child upon reaching the age of 21 (or to the child's estate upon death of the child prior to 21).

Another popular vehicle that allows funds to be set aside for a child, but controlled by an adult, is a custodial account. A custodial account typically follows the general formats established under the Uniform Gift to Minors Act, or the Uniform Transfers to Minors Act. Under either statutory format, an account is created for the benefit of a single minor beneficiary, and control of the account is vested with a person of legal capacity. The income from the account is taxed directly to the minor beneficiary, and upon reaching the age of majority, the property in the account must be distributed to the beneficiary.

The mandatory distribution at the age of majority from custodial accounts can be a significant drawback, since most persons who are eighteen to twenty-one years of age do not possess the maturity to wisely spend the trust property. A non-statutory trust (i.e., a trust other than a custodial account), on the other hand, can and usually does terminate at an age beyond the age of majority, since the grantor of a trust recognizes that a better practice is to delay termination of the trust and distribution of the trust property until the beneficiary is a number of years past the age of majority.

In this regard, another type of trust, referred to as a "Crummy" trust, can leverage the gift tax exemption under IRC §2503(b) without regard to a terminating distribution at the age of majority of the beneficiary. Under the Crummy trust (also known as a "demand right" trust), the child is provided with a window of time, for example the thirty day period after a contribution is made, to demand a distribution of the contribution; if the child does not exercise this option, the contribution remains in the trust, and the trust can continue until a later age specified in the trust.

It has been envisioned, in connection with the present invention, that many adults would like to obtain the benefits of a trust vehicle for their children's education and support. However, under conventional approaches, significant time, effort, and expense is involved in the creation and management of a trust. Typically, an attorney is consulted to draft the trust instrument itself. In addition, accounts for holding the trust assets must be established with a financial institution; these accounts may often render the selection and changing of investments rather cumbersome for the trustee. Further, the trust itself must prepare and file certain informational tax filings, annual tax returns, and quarterly tax filings and payments, and also can be subject to filing accountings with a court that may be supervising the trust. Because of these cumbersome and sometimes costly tasks, trusts for minor children have typically been reserved for large contributions, and are not cost-effective for modest sums.

In recent years, the popularity and use of the Internet has exploded. Many consumers are now comfortable with ordering goods and services over the Internet either directly from the source or by way of auction sites, and with using online payment systems ranging from credit card transactions, to ECHECK and PAYPAL payment services, and the like. The Internet has also become popular for online real-time securities trading, particularly with the availability of low-cost online brokerage services. Accordingly, many efficiencies are provided by the Internet in connection with today's economy.

By way of further background, many states and educational institutions have now created programs commonly referred to as "qualified state tuition plans" or "qualified tuition plans" (referred to in this specification as "QTPs"). These plans are governed by IRC §529, as currently effective and under enacted revisions becoming effective in January, 2002. While QTPs are administered by states and by educational institutions, the marketing of the plans and the management of the underlying investments supporting the plans are typically handled by financial institutions such as brokerage accounts, under contract to the administering state agency or educational institution. In general, QTPs permit persons (including natural persons, corporations, and other entities) to purchase tuition credits or certificates on behalf of a designated beneficiary or, depending on the particular QTP, to contribute to an account that is established for the purpose of meeting "qualified higher education expenses". Generally, "qualified higher education expenses" include tuition, fees, books, supplies, equipment, room and board expenses (if the beneficiary meets certain enrollment and attendance requirements), that are spent in connection with attendance at an eligible educational institution.

Under current U.S. tax law, no amount distributed from or earned within a QTP is included in the income of either the contributor or the beneficiary of the QTP, except to the extent that the distributions (or deemed value of the benefits) exceed the contributions made on behalf of the beneficiary, in which case such excess is considered as gross income to the recipient (which may be either the contributor or the beneficiary).

The terms and conditions of QTPs can vary somewhat, as they are offered by different organizations and state governments. In general, though, distributions and withdrawals from QTPs that are not applied to qualified education expenses may incur tax and a penalty. In addition, because contributors can generally access the funds in the QTP accounts, these funds may be subject to claims of creditors, disposition by a trustee in bankruptcy, distribution upon divorce, and the like. In addition, the assets held in a conventional QTP can be considered in determining eligibility for federal and private educational financial aid programs.

By way of still further background, recently enacted U.S. legislation now provides for an educational individual retirement account ("EIRA"), governed by IRC §530 and its implementing regulations. Under an EIRA, persons (including natural persons, corporations, and other entities) may contribute cash to an account for a designated beneficiary, under the stipulation that distributions from the account must be used for "qualified education expenses", which are defined under the law as the eligible expenses under a Qualified Tuition Plan, and also including qualified elementary and secondary school education expenses.

Under current U.S. tax law, income within the EIRA is not included in the gross income of either of the contributor or the beneficiary of the EIRA. Distributions from the EIRA are also tax free, unless the distributions exceed "qualified education expenses", in which case tax and penalty may be due.

Because EIRAs are still quite new, it is possible that EIRA assets may be considered in determining eligibility for federal and private educational financial aid programs. In addition, the contributions to an EIRA by a contributor may be limited by the modified adjusted gross income of that contributor.

By way of further background, U.S. Pat. Nos. 6,064,986 and 6,085,174 disclose computer-assisted processes and systems for trust management. As described in these references, the computer systems assist in the management of retirement trusts, particularly in determining whether the retiree is of proper age to receive distributions from the trust without incurring a tax penalty. These references describe such a system and processes in which the trust is established off-line, for example by an attorney on a pre-authorized list.

By way of further background, U.S. Pat. No. 5,878,405 describes a computerized pension planning and liquidity management system, for example for maintaining an employee pension system. According to this reference, the making of loans to employees against their pension is automated by way of a clearinghouse system for the loans. The system described in this reference generates periodic reports to the participants in the managed pension plan, as well as standard pension accounting reports and regulatory reports necessitated by the appropriate statutory scheme (e.g., ERISA).

By way of further background, U.S. Pat. No. 5,913,198 describes a computer-implemented method for designing self-funded survivor benefit plans for an employer, with the design including the level of contributions necessary from the employer and employee. The contributions are maintained in a conventional trust plan, by a previously named trustee, and the computer periodically generates reports to the trustee concerning the necessary level of contributions.

By way of further background, U.S. Pat. No. 6,161,096 describes another computerized apparatus for managing a deferred award instrument plan for employees, including the automated detecting of whether life insurance ought to be purchased by a participant, and suggesting the establishing and management of a Rabbi trust for the spread between the strike price of stock options and the market value of the stock associated with the options.

By way of still further background, online Internet gift registries are well known, by way of which family members and friends may select gifts for a registered recipient. One such known gift registry is one in which the recipient selects stock in certain companies, from which others may choose to purchase one or more shares as a gift for a particular occasion.

By way of still further background, the use of the Internet to solicit gift contributions for a previously established trust is also known.

BRIEF SUMMARY OF THE INVENTION

It is therefore an object of the present invention to provide an online automated trust creation, administration, and account management system and method.

It is a further object of the present invention to provide such a system and method that can immediately and dynamically establish a trust from inputs and funding received online from a trust grantor and trustee, without incurring the substantial overhead cost and trouble associated with conventional trust creation techniques.

It is a further object of the present invention to provide such a system in which the grantor is able to name any adult person as trustee, without being limited to a predefined trustee or set of choices for the trustee or financial accounts manager.

It is a further object of the present invention to provide such a system in which email or other automated communications can be used to effect beneficiary notification provisions of demand right trusts.

It is a further object of the present invention to provide such a system in which periodic reporting and accounting can be maintained at low cost to the trust.

It is a further object of the present invention to provide such a system in which a wide range of investment choices and flexibility in transferring assets or funds, including the use of QTPs and EIRAs, is made available to the trustee.

It is a further object of the present invention to provide such a system in which family members, friends, and other third parties, including the sellers of goods and services, may make contributions to the trust.

It is a further object of the present invention to provide such a system in which the trustee and beneficiaries can monitor the performance of the trust.

It is a further object of the present invention to provide such a system in which the beneficiaries are encouraged to solicit additional gifts to the trust, not only from the grantor but also from other contributors such as friends and family, and to communicate with the donors both to solicit and also to acknowledge gifts to the trust.

It is a further object of the present invention to provide a system and method in which the grantor is pre-screened with both an identity check and a credit check to determine whether the person is suitable for proceeding as the grantor.

It is a further object of the present invention to provide such a system and method in which, as part of the trust creation or administration, uses an online computer automated identity check of the trustee and other persons that are responsible for trust property.

It is a further object of the present invention to provide such a system and method of integrating trust and account information stored in a trust account database with a process for filing informational federal and state tax forms, filing and paying federal and state tax returns and tax payments, as well as notifying the grantor or grantors of any trust income accrued and attributable to the particular grantor.

It is a further object of the present invention to provide such a system and method for employing digital or electronic signatures and certificates in the creation, administration, and termination of the trust, and of accounts created by or through the system and method.

It is a further object of the present invention to provide such a system and method for monitoring contributions from grantors and others so that contributors can be warned if the aggregate contributions for the relevant tax year exceed the amounts exempted under federal or state tax laws.

It is a further object of the present invention to provide such a system and method for notifying beneficiaries of a demand right or Crummy trust of their right of withdrawal to contributions made from persons other than the original grantor.

It is a further object of this invention to provide a vehicle by way of which contributions to an Educational Individual Retirement Account (EIRA) may be made, without affecting the ability to obtain federal or private educational financial aid.

It is a further object of this invention to provide a vehicle by way of which contributions may be made to an EIRA without being limited by the income levels of the contributor.

It is a further object of this invention to provide a vehicle by way of which assets in a qualified tuition plan (QTP) may be shielded from creditors, bankruptcy, and other claims.

It is a further object of this invention to provide a vehicle that provides higher confidence that the assets of the QTP or the EIRA will actually be used for educational purposes, by operation of the terms of the trust.

Other objects and advantages of the present invention will be apparent to those of ordinary skill in the art having reference to the following specification together with its drawings.

The present invention may be implemented in connection with an online method and computerized system, accessible over the Internet, by way of which a grantor can establish a trust. According to this invention, a grantor establishes a trust by naming the beneficiary and the purpose of the trust, nominating one or more trustees, and by funding the corpus of the trust via an online payment system. The dynamic trust creation is completed upon verification of identity and receipt of digital signatures of the various parties to the trust. Once the trust is established, the system contacts the trustee and beneficiary to obtain such consents as are necessary under the appropriate law, and to generate and file necessary tax filings, which may include an application for an employer identification number. The trustee then can access the trust corpus to establish accounts with financial institutions for the investment of the corpus. A clearing house function and other functions are provided by the system to effect transfers of trust assets among various accounts and investments within the accounts. Tax reporting and other accounting is provided by the automated system, further reducing the cost of managing the trust.

According to another aspect of the invention, a trust is used to receive contributions for an Educational Individual Retirement Account ("EIRA") or a Qualified Tuition Plan ("QTP"). The trust may be created online, or may alternatively be an existing trust. In either case, electronic contributions to the trust, and to the EIRA and QTP accounts in the trust, are made by the grantor, by friends or family members of the beneficiary (including the trustee), and also possibly by third parties, including the sellers of goods and services in the form of rebates. The accounts within the trust are then managed by the trustee. The trust is managed by the trustee establishing financial institution accounts, and by the system effecting clearing house functions. Control of distributions and tax reporting are also provided by the automated system.

BRIEF DESCRIPTION OF THE SEVERAL VIEWS OF THE DRAWING

FIG. 5 is a flow chart illustrating the operation of the network of FIG. 2 in further completing the creation of the trust according to the preferred embodiment of the invention.

FIG. 6 is a flow chart illustrating the process of initial trustee operations according to the preferred embodiment of the invention.

FIGS. 7 and 8 are flow charts illustrating trustee operations in connection with the process of FIG. 6 according to the preferred embodiment of the invention.

FIG. 10 is a flow chart illustrating an initial set up of a home page by the beneficiary according to the preferred embodiment of the invention.

FIG. 11 is a flow chart illustrating certain management possibilities on behalf of the trustee according to the preferred embodiment of the invention.

FIG. 14 is a flow chart illustrating the solicitation and receipt of gifts to the trust, according to the preferred embodiment of the invention.

FIG. 15 is a flow chart illustrating a process of terminating a trust according to the preferred embodiment of the invention.

FIG. 16 is a chart illustrating the relationship among accounts within a trust vehicle according to the preferred embodiments of the invention.

DETAILED DESCRIPTION OF THE INVENTION

It is contemplated that the present invention may be used in connection with the financial management of assets by way of trusts, in a wide range of applications. The preferred embodiment of this invention will now be described by way of a particular example. However, because of the wide applicability of this invention in the field, it will be understood by those skilled in the art having reference to this specification that this description is provided by way of example only, and is not intended to limit the scope of this invention as claimed.

Figure 1:
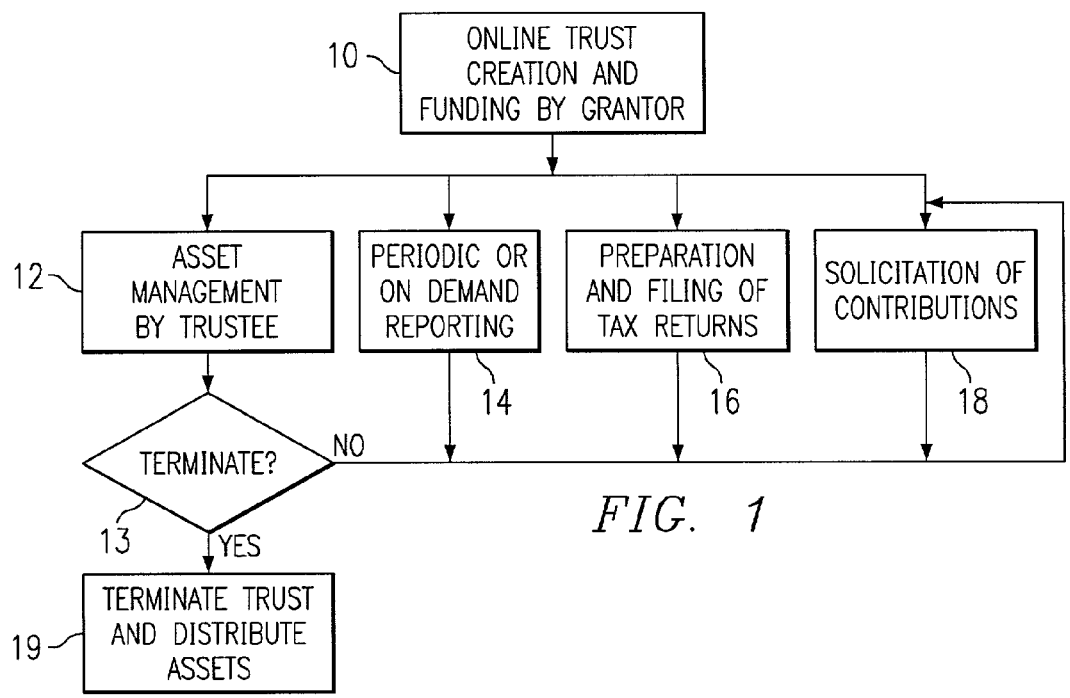
FIG. 1 is a flow chart illustrating the overall operation of the present invention in creating and managing a trust.
Figure 2:
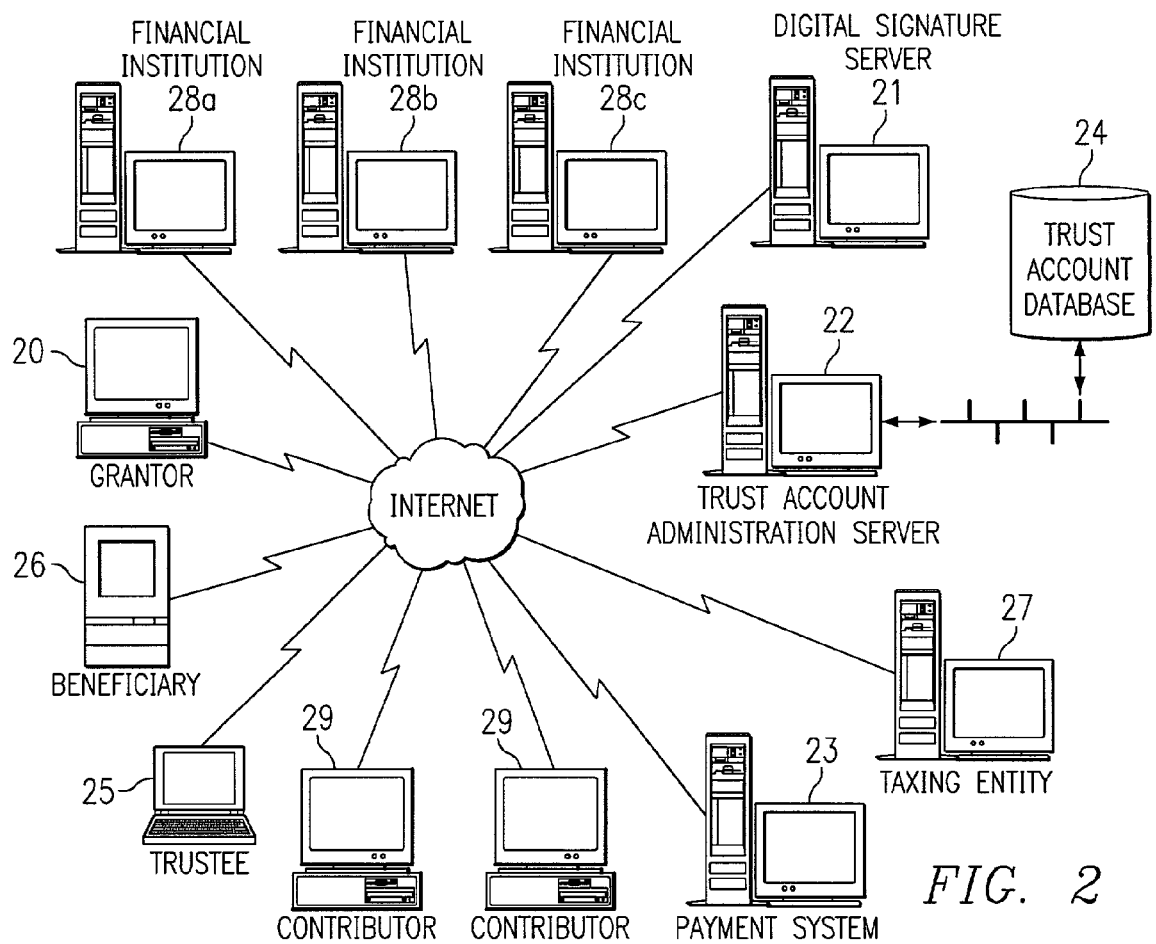
FIG. 2 is a network diagram illustrating the interconnectivity among computers over the Internet, according to the preferred embodiment of the invention.

Referring first to FIGS. 1 and 2, an Internet-based trust creation and management system and method according to the present invention will be described in a relatively general sense. A more detailed description of the particular steps carried out according to the preferred embodiment of the invention will then follow.

FIG. 1 is a high-level flow chart of the major functions carried out in connection with the preferred embodiment of the invention. The trust is created in process 10 by the grantor of the corpus of the trust, by way of an interactive online process over a computer network, preferably the Internet. As will be described in further detail below, according to the preferred embodiment of the invention, the grantor establishes the trust by identifying himself or herself, identifying the beneficiary, nominating a primary trustee and possibly a contingent, or secondary, trustee, and then funding the trust. As part of the creation process, the grantor may employ digital or electronic signatures or certificates to aid in identifying the grantor, and in executing the trust. It is further contemplated that the grantor may be provided, by the trust administrator, with the opportunity to obtain a digital signature or certificate from the trust administration website, or through an interface with commercially available digital signature or certificate providers, for use in identity verification and signature acknowledgement. In addition, an interface with commercially available credit reporting agencies may be provided, by way of which the trust administrator can determine the suitability of the grantor.

As is known in the art, a trust exists upon the grantor conveying the trust corpus to another party, with the intent that the corpus (and possibly its income) equitably belong to an identified beneficiary. While a trust theoretically exists upon legal title and equitable title in the property being split (such that upon merger of legal and equitable title, the trust ends), in most jurisdictions a trust will not fail for want of a trustee. Accordingly, while in process 10 a trustee will be nominated by the grantor, the trust can exist, and is therefore created, prior to acceptance by the trustee of the responsibilities of the trust. Importantly, according to this invention, the trust can be fully created and funded by the grantor online, over the Internet, in a single instance of process 10. In the event that the beneficiary exercises his or her right to take possession of the grantor's gift to the trust (e.g., in a demand right trust), a notice and consent process can also be carried out in connection with process 10.

In the global network of FIG. 2, grantor computer 20 is used by the grantor in the creation and funding of the trust in process 10. As shown in FIG. 2, grantor computer 20 is in communication with trust account administration server 22 via a secured connection to the Internet, which is a computer operated by the trust administrator. It is not important, for purposes of this description, how each of computer 20, server 22 (or any of the other computers in the system of FIG. 2) connect to the Internet, whether by dial-up modem, high-speed (DSL or cable modem) access, via wireless access, or through a local network to a server that itself resides on the Internet. Trust account administration server 22 is coupled to trust account database 24, which stores the necessary information regarding each trust, in a manner associated with the corresponding trust, for use by the trust administrator in trust management and account administration regarding that trust, according to the preferred embodiment of the invention. As will be described in further detail below, payment system computer 23 effects the funding of the trust, upon receipt of the appropriate request and authorization over the Internet from grantor computer 20, forwarding a corresponding account entry over the Internet to trust account administration server 22. Server 22 preferably carries out a clearing house function, or interfaces with a commercially available service to perform the account clearing house function, or a combination of both. Trust account administration server 22 will also interface with credit card processors and financial institutions, ensuring the proper charges and credits requested in connection with the trust creation.

As will also be described in further detail below, many important trust creation functions may also be performed in process 10. One such function may be the automated application for a Employer Identification Number ("EIN") for the trust, considering that the trust may be a taxable entity. It is contemplated that trust account administration server 22, in response to information provided by the grantor and the trustee over the Internet, will directly contact the taxing entity (e.g., Internal Revenue Service) by way of the Internet and taxing entity computer 27, as shown in FIG. 2, to apply for, receive, and communicate the EIN, and possible to electronically file tax returns and make tax payments. Alternatively, trust account administration server 22 may issue an EIN to the trust from a block of EINs that were previously granted by the IRS to the trust administrator.

Following establishment of the trust in process 10 of FIG. 1, various functions can now be carried out by the various parties to the trust over its life, as shown in FIG. 1. Process 12 is carried out by the trustee (upon acceptance of the role, by digital signature or other affirmative act) to manage the assets of the trust. This administration is effected by the trustee over the Internet, via trustee computer 25 in combination with trust account administration server 22 and financial institution computers 28a through 28c. As will be described in further detail below, process 12 includes such actions as the establishment of brokerage and other accounts with financial institutions such as securities firms, banks, and the like, each of which access the Internet via a corresponding one of financial institution computers 28*a* through 28*c*. Additionally, the trustee is able to move assets into and out of various investment vehicles (stocks, bonds, interest-bearing accounts, life insurance contracts, mutual funds, and the like) within a particular account, and also among the various accounts, all in process 12. In addition, as will also be described below, the trustee can distribute trust funds to the beneficiary within the terms of the trust, also in process 12. As part of the role of the trustee, the trustee and trust account administration server 22 can carry out decision 13, to determine whether an event has occurred by way of which the trust is to terminate. If not (decision 13 is NO), the various trust processes continue to be performed.

In process 14, trust account administration server 22 according to this embodiment of the invention generates the desired reports on a periodic, or on demand, basis. These periodic reports are preferably communicated to the interested parties over the Internet, for example by way of an email message containing the report, or alternatively by way of an email message inviting the party to interrogate trust account administration server 22 to retrieve the reports. The grantor and trustee each can access the generated reports, or request and retrieve special reports, over the Internet by way of grantor computer 20 and trustee computer 25, respectively. In addition, it is contemplated that the beneficiary of the trust will also have Internet access via beneficiary computer 26, and can monitor the trustee's performance and the assets of the trust by way of periodic or on-demand reports generated by trust account administration server 22; depending upon the terms of the trust and the age or status of the beneficiary, it is also contemplated that the beneficiary may also request full or partial distribution of the trust assets by an online request over the Internet.

In process 16 of FIG. 1, trust account administration server 22 is used to facilitate the preparation and filing of tax returns or information, and sometimes payment of taxes, on behalf of the trust. In one implementation, it is contemplated that trust account administration server 22, and the overall administration of the system, will be operated and managed by an accountant or accounting firm, serving as the trust administrator; in this case, the trustee can commission the managing accountant to file the automatically generated tax return on behalf of the trust. It is contemplated that such tax preparation and filing will be more convenient and less costly to the trustee and to the trust, while still being more efficient and profitable on the part of the trust administrator. Indeed, it is contemplated that the trust tax return may be filed electronically through taxing entity computer 27 over the Internet, after review by the tax preparer or accountant, providing further efficiency and profitability. Such automation of tax filing is especially contemplated to be an attractive feature of this system in the creation of small gift-based trusts.

Process 18 of FIG. 1 refers to the ability of the system according to the preferred embodiment of the invention to automate the solicitation of contributions to the trust, as well as the acknowledgement of gifts received. As noted above, it is contemplated that the present invention will be particularly attractive in connection with the creation and management of relatively small trusts, at least small at the time of initial funding. It has been observed, in connection with the present invention, that many family members and friends of minor children may wish to make small monetary gifts for birthdays, holidays, religious events, graduations, and the like, and would be happier to give monetary gifts to an educational or other trust, where the donors would have confidence that their gifts would be used wisely, and under supervision. As will be described in further detail below, the trust administration system and method according to the preferred embodiment of the invention provides the beneficiary with a way to request contributions in honor of upcoming events. More specifically, the solicitations may be made by way of email communications to the potential contributors; the contributions, in turn, may then be made by the contributors via contributor computers 29, through the use of a conventional online payment system (via payment system computer 23 and the clearing house function of server 22).

Another source of contributions to the trust, particularly those in which QTP or EIRA accounts have been established, are incentive programs from sellers of goods and services. For example, many companies are now offering partial rebates to purchasers of their goods and services, with the rebates being dedicated to an existing QTP, and automatically deposited into the account. The contributor sets up the rebate by establishing an account with the manager of the program, and by indicating that the wishes his rebates to be forwarded to a specified educational account. It is contemplated that such rebate contributions, as well as other third party contributions, may be made by a friend or family member of a beneficiary, or by another party, into a QTP, EIRA, or other account, within a trust established or managed according to this embodiment of the invention.

Further in connection with process 18, the present system is contemplated to provide the beneficiary with a demand right or "Crummy" notification of the receipt of a contribution, solicited or otherwise, for example by way of an email message sent by trust account administration server 22 over the Internet to beneficiary computer 26. Following such notification, the beneficiary can then send an acknowledgement (or "thank-you") from beneficiary computer 26 over the Internet to the contributors via their computers 29; trust account administration server 22 can also provide suggested electronic thank-you cards for this purpose. The beneficiary can also directly send a notification to the trustee exercising the demand right.

Upon the terminating event occurring (decision 13 is YES), control passes to process 19, in which the trustee and trust account administration server 22 carry out the functions of termination of the trust. In process 19, the parameters for distribution of trust property are interrogated to ensure that the trust is terminated according to its terms and according to law. Trust account administration server 22 then effects a clearing house type of function to retrieve the assets from the accounts corresponding to the trust, from the appropriate financial institutions (via computers 28), and effects distribution of these assets to the appropriate beneficiary, for example by way of payment system computer 23 electronically transferring or crediting funds to the beneficiary's accounts. The trustee can elect to distribute the assets to the beneficiary either in kind, as a payout as noted above, or as a combination of both. For an in kind distribution, trust account administration server 22 can re-title the accounts at the trust financial institutions from the name of the trust (or trustee) to the name of the beneficiary. In any event, the trust may then terminate, by its own terms, upon distribution of all of its assets. Prior to termination, trust account administration server 22 preferably computes a dynamically determined amount to be withheld from distribution, to satisfy obligations of the trust such as taxes and fees.

Figure 3:
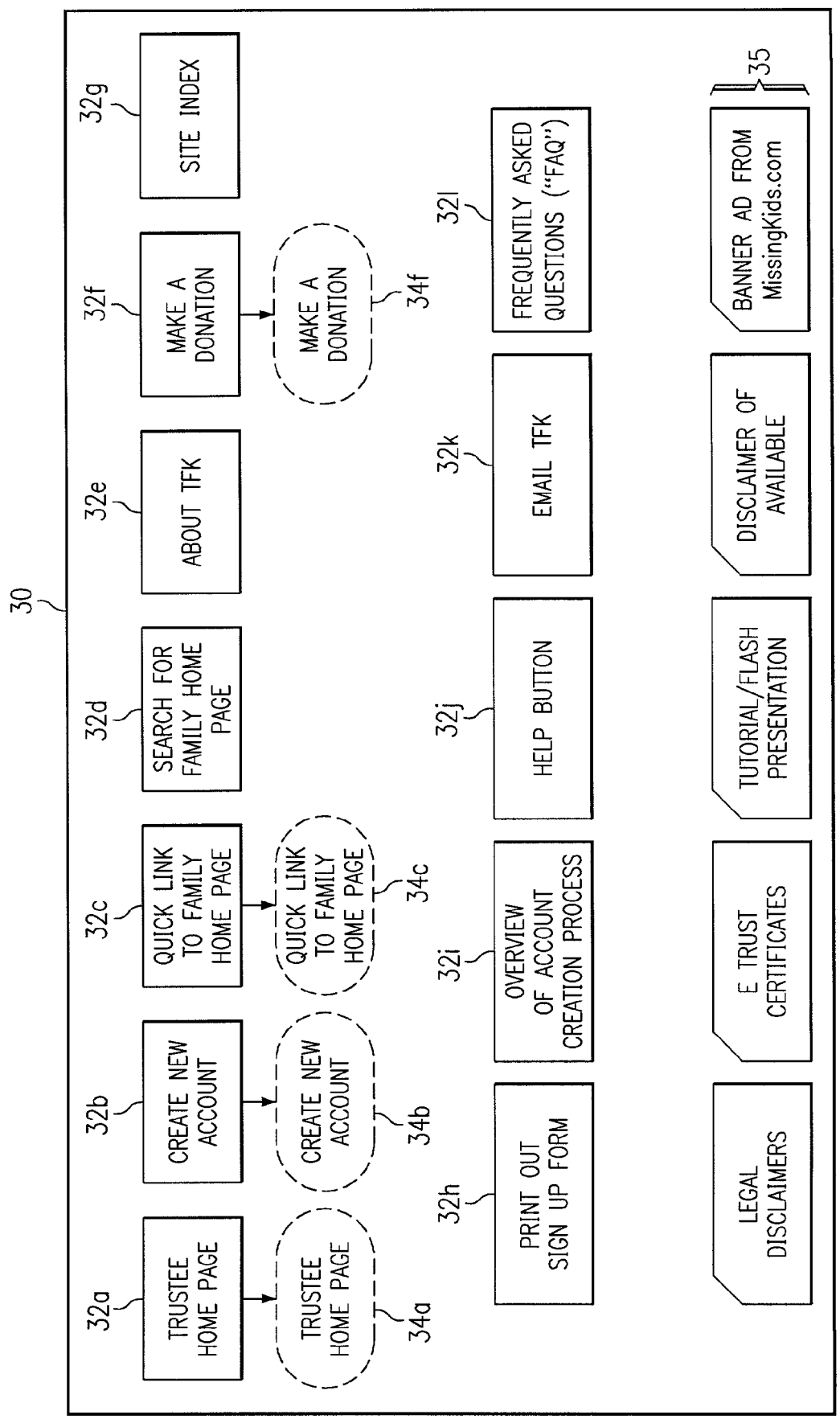
FIG. 3 is a graphic illustration of an entry home page into the trust administration server according to the preferred embodiment of the invention.

FIG. 3 illustrates portal home page 30, by way of which trusts can be created, monitored, and managed according to the preferred embodiment of the invention. Home page 30 is contemplated to be an Internet website supported by trust account administration server 22, and as such will be accessible by way of a conventional URL (Uniform Resource Locator) website address. As evident from FIG. 3, home page 30 is suitable for access by any of the parties of an existing trust, including the grantor, beneficiary, trustee, and contributors, by a potential grantor of a new trust, and by the interested public. Home page 30 includes hyperlinks 32, by way of which the viewing party may jump to another page at the trust website. As will be described in further detail below, some of hyperlinks 32 are associated with processes 34 that will be described in further detail below. Other hyperlinks 32h through 32l are illustrated in FIG. 3, and are contemplated to be useful in connection with conventional website functions such as FAQs, email contacts, and the like. Other website elements 35 are also provided at home page 30, by way of which disclaimers, advertisements, and the like may be accessed and viewed.

Figure 4:
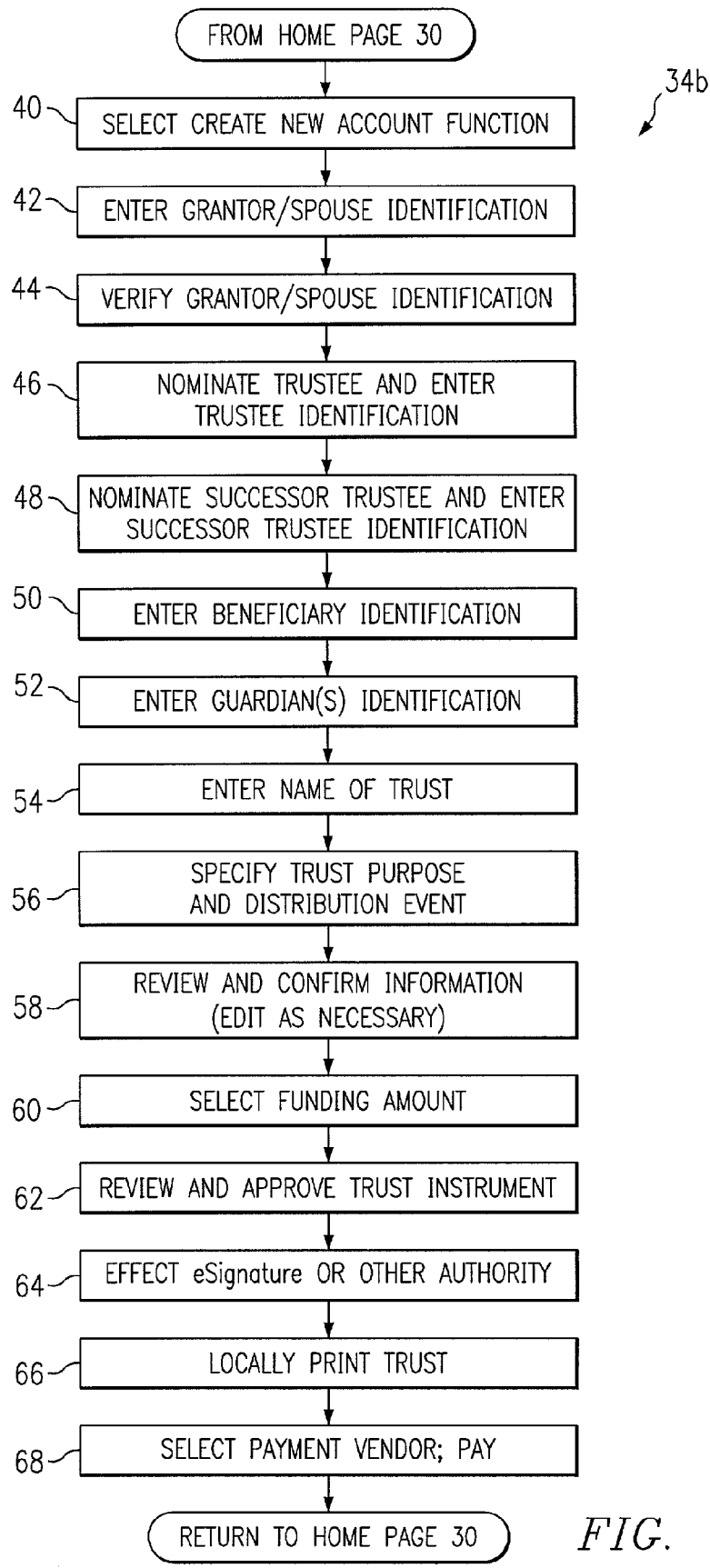
FIG. 4 is a flow chart illustrating the operation of the network of FIG. 2 according to the preferred embodiment of the invention.

For creation of a trust, the grantor will select hyperlink 32b, entitled "Create New Account", and trust account administration server 22 will then initiate interactive process 34b for the creation of the trust (effectively corresponding to function 10 in the overview of FIG. 1). FIG. 4 illustrates trust creation process 34b according to the preferred embodiment of the invention, which will now be described in detail. The use of an Internet-based communication and interactive process, for example according to the network of FIG. 2, will be assumed for the following description of each of the processes according to this preferred embodiment of the invention. It is of course to be understood that other alternative network communications (e.g., interactive television) and the like may alternatively be used in connection with this invention. In particular, it will be evident from the following description that certain processes may be carried out on various ones of the computers and servers on the network, depending upon the particular implementation.

In process 40, the grantor is preferably presented with sufficient information regarding the nature of a trust, the benefits (and disadvantages) of the trust, the advantages of establishing the trust through the interactive system provided by the trust administrator, and also the requirements of a valid trust. Upon the grantor reviewing these and other presentations, and the grantor wishing to continue the process, the grantor will select a link to continue setting up the process, and control passes to process 42, in which trust account administration server 22 presents the grantor, via grantor computer 20, with an input screen, online form, questionnaire, or "wizard" application, by way of which the grantor enters identifying information regarding himself or herself, and also about his or her spouse (particularly in community property states, or if the initial funding of the trust will exceed the individual gift tax exemption of $10,000).

As part of process 42, trust account administration server 22 interrogates trust account database 24 to determine if this grantor has already established other trusts; if so, server 22 can present the grantor with previously entered information to facilitate the trust creation process. If not, the grantor will need to initially enter self-identifying information, and identifying information about his or her spouse (if married), in process 42. This information will include such items as names, addresses, email addresses, telephone numbers, date and place of birth, social security numbers, and the like. Conventional identifying information used in connection with financial accounts to confirm identity, such as mother's maiden name, may also be collected in process 42. Preferably, the grantor again affirmatively confirms that he or she wishes to establish a trust upon completing process 42, and provides affirmative consent to the extent necessary for trust account administration server 22 to confirm the identity and creditworthiness of the grantor. In addition, married grantors may be provided with the ability to confirm or deny whether their spouse wishes to participate in the trust.

In process 44, trust account administration server 22 checks the information input in process 42 for completeness and accuracy. At a first level, server 22 determines whether any required fields were not filled in, and queries the grantor for entries into those missing fields. Upon receiving a complete entry, according to the preferred embodiment of the invention, trust account administration server 22 also interrogates public and private databases available on the Internet to confirm that the grantor is a person having the capacity to create a trust (e.g., of legal age), and that the identifying information refers to that person; additionally, if desired, a credit check process can also be initiated upon receipt of this information (and any necessary consent from the grantor, provided in process 40). If an exception regarding the identity or creditworthiness of the grantor arises, the process is halted by the trust account administration server 22, and the grantor may be encouraged to contact the trust administrator by another means (telephone, in person, etc.). Upon clearing the initial identity check, the trust creation process can continue.

In process 46, the grantor enters, via grantor computer 20, the name and identifying particulars regarding the person that he or she wishes to nominate to be the trustee of the trust being created. This information includes, as in the case of the grantor, such information as name, address, email address, phone numbers, date and place of birth, social security number, and the like. Similarly as discussed above relative to the grantor's identifying information, trust account administration server 22 will, in process 46, verify the identifying information regarding the trustee against public and private databases to the extent possible, again to ensure that the nominated trustee actually exists, and is of legal age and capacity to carry out the duties of trustee. Alternatively, the trustee identification check can be done at such time as the trustee logs in, as will be described below. Of course, the ability to interrogate credit databases may be limited at this point, considering that the trustee has not yet consented to the identity check.

In process 48, the grantor enters similar information in nominating a successor trustee. The successor trustee is identified to serve as the trustee in the event that the nominated primary trustee declines the responsibility, or dies or becomes otherwise incapacitated. Similarly, as in process 46, trust account administration server 22 receives the identifying information, and initiates the identity check to the extent possible, if such a check is desired at this time. Assuming no errors, control will then pass to process 50.

In most states, a trust will not fail for want of a trustee. Accordingly, in the event that none of the nominated trustees can or will serve as trustee, trust account administration server 22 will later contact the grantor by email or otherwise. The grantor can then nominate another person or persons, or entity, to serve as trustee; if the grantor is unavailable, the beneficiary or guardian can be contacted and can nominate another trustee. Alternatively, the trust administrator can present the grantor with a default trustee, which may be a bank or other financial institution, which can serve as the trustee (upon grantor's agreement) if no trustee is nominated or those nominated cannot or will not serve.

In process 50, the grantor now enters, via grantor computer 20, the name and identifying information of the beneficiary. Similar information is provided regarding the beneficiary as was provided for the grantor himself and the nominated trustees; as before, trust account administration server 22 carries out such identity checking on this information as can be performed, to ensure that the identifying information is complete and refers to a living person who is eligible to be the beneficiary. In the event that the grantor accurately indicates that the beneficiary is a minor child, trust account administration server 22 then forwards an input screen to grantor computer 20, by way of which the grantor identifies the parents or guardians of the minor beneficiary, in process 52. A specific interactive question may also be directed to the grantor to determine whether the identified guardians are in fact the parents of the beneficiary, because of certain important tax consequences relating to Grantor Trust taxation rules, under current United States tax law. As before, trust account administration server 22 checks the completeness of the identifying information as submitted, and also the accuracy of that information as referring to a living person with a colorable relationship to the beneficiary, also in process 52.

It is contemplated that more than one beneficiary may be named for a given trust. For example, one beneficiary may have equitable title to the proceeds or income from the trust, while another beneficiary (e.g., a reversionary beneficiary) has equitable title to the principal assets of the trust. While few trusts may be this complex, perhaps for tax reasons, the trust system and method according to the preferred embodiment of the invention is capable of managing such a complex arrangement. For purposes of clarity in the following description, however, a single beneficiary will be assigned, it being understood by those skilled in the art having reference to this description that the inclusion of additional beneficiaries may be made and managed in a similar manner as described herein.

In process 54, the grantor names the trust, by entering a name in an onscreen field forwarded by trust account administration server 22 to grantor computer 20. The name of the trust is not essential, and will be used primarily for others to access the trust for monitoring and contributions. However, it is important that the trust name be unique; as such, trust account administration server 22 will interrogate trust account database 24 to determine whether the input trust name has already been adopted, in which case the grantor will be prompted to input a different trust name.

In process 56, the grantor specifies the purpose of the trust, and the event upon which the trust is to terminate and its assets distributed. While it is contemplated that most trusts that will be established by way of the system of the preferred embodiment of the invention will be educational or support trusts established for the benefits of minor children, it is also contemplated that the present system is suitable for use in a wide range of trust purposes. Accordingly, it is contemplated that trust account administration server 22 will communicate a screen or input field to grantor by way of which the grantor can select from several trust purposes (e.g., educational trusts, trust for the health, maintenance and welfare of the minor), for example by way of a pull down menu, or can enter his or her own specific purpose for the trust. These trust purposes may also include express provisions that allow the trustee to establish, fund, and manage accounts such one or more accounts dedicated to the funding of educational expenses incurred by the beneficiary. It is contemplated that these educational accounts may take the form of a qualified tuition plan ("QTP"), established by state governments or by educational institutions, or an Educational Individual Retirement Account ("EIRA") under IRC §530. Similarly, while it is contemplated that many trusts will be intended to terminate upon the beneficiary reaching a certain age, or accomplishing a certain educational goal, other termination events may also be contemplated by the grantor. Accordingly, also in process 56, the grantor is preferably presented with a pull down menu for the selection of the distribution event, with one choice being an open field into which the grantor can indicate a specific terminating event. It is also contemplated that the trust purpose and termination event can be linked to one another (e.g., an educational trust that terminates upon receiving an undergraduate degree), or that specific trust purposes and termination events can be derived by sponsors and included in the plan. For example, if a QTP is established under the trust, the termination provisions may also expressly grant the trustee the authority to terminate the QTP and distribute the assets to another account in the trust or to the beneficiary.

Following entry of the trust purpose and termination event in process 56, trust account administration server 22 next initiates process 58, by way of which the trust parameters entered by the grantor are re-communicated to grantor computer 20 for review and confirmation. It is preferred that each group of information be separately communicated to, reviewed by, and confirmed by the grantor, to minimize error and maximize conscious acceptance by the grantor. For example, a sequence of editable screens are preferably communicated to grantor computer 20, separately conveying grantor identification information, grantor spouse identification information, trustee identification information, successor trustee identification information, beneficiary identification information, guardian identification information, the name of the trust, and the trust purpose and termination event. Following the transmission of each set of information to grantor computer 20, the grantor is encouraged to edit or confirm the communicated information.

Upon successful editing and confirmation of the trust information in process 58, the grantor is next prompted by trust account administration server 22 to select the amount of initial funding for the trust, in process 60. It is contemplated that a minimum contribution amount will be required to establish the trust, and that a creation fee payable to the trust administrator will be added to the funded amount. Once the grantor has set an initial funding amount in process 60, trust account administration server 22 forwards a draft copy of the trust instrument to grantor computer 20, for viewing by the grantor. According to the preferred embodiment of the invention, the grantor can read the trust instrument online and continue the current interactive session, or alternatively the grantor can download or print the draft trust instrument for later review and acceptance, in which case the interactive session can be terminated, for later resumption at this point in trust creation process 34*b*.

If the grantor elects to accept the draft trust instrument communicated in process as the trust, process 64 is then carried out by way of which the grantor digitally signs the trust. Digital signature technologies are currently being carried out in connection with many types of documents and communications. Typically, according to current technology, digital signatures are created and verified by cryptography. For example, the signing party (i.e., the grantor) may transmit a digital signature from grantor computer 20 to trust account administration server 22, which in turn forwards the digital signature to digital signature server 21 over the Internet; digital signature server 21 then determines, from its database, whether the signature is valid, and advises trust account administration server 22 of that result. Several vendors of digital signature software and services are now known in the art; it is contemplated that trust account administration server 22 will provide access to multiple ones of such digital signature methods, for the convenience of the grantor. Further in the alternative, it is contemplated that an unequivocal act on the part of the grantor via grantor computer 20 may be adequate to effect signature of the electronic trust document. In process 66, the grantor may optionally print a copy of the trust document itself, on a printer attached to grantor computer 20, if desired.

The trust is finally established as a trust upon funding, which occurs in process 68, beginning with the selection, by the grantor via grantor computer 20, of one of several acceptable manners of payment. It is contemplated that trust account administration server 22 can effect funding of the trust by way of a charge to the grantor's credit card, electronic funds transfer (EFT), or by another electronic method such as ECHECK or PAYPAL payment system services now available over the Internet. If the grantor selects one of the acceptable electronic payment methods in process 68, trust account administration server 22 communicates with the corresponding payment system computer 23 (FIG. 2) over the Internet, to verify that the grantor's account with that payment vendor has sufficient funds (or credit) to effect the payment, and to then charge that amount in the conventional manner for ecommerce payment. The trust is now established, considering that a corpus has now been conveyed in a manner in which equitable title is separated from legal title. This funding is communicated to the grantor by way of a screen appearing, in the interactive session, on grantor computer 20, and preferably also by way of a separate email or written communication. This communication preferably communicates important information regarding the particulars of the newly-created trust, and the account that has been established with the trust administrator. The grantor is then returned to the trust administration home page 30.

Referring now to FIG. 5, the performing of various bookkeeping acts relative to the new trust that are performed by the trust administrator, using trust account administration server 22, will now be described. These particular processes may be carried out in any order as desired by the trust administrator.

In process 70, trust account administration server 22 stores the appropriate entries in trust account database 24, in a manner associated with the newly created trust. These entries will include those necessary or convenient for the administration of the trust, including those entries important for tax and other accounting, as well as those other entries that facilitate retrieval of trust information from database 24. In this regard, it is contemplated that trust account database 24 will store information regarding each trust account that includes: identifying information regarding the beneficiary, guardian of the beneficiary, trustee, and the grantor; a transaction history of the trust; links to and information regarding the financial institution accounts, and journal entries for transactions into and out of those accounts; confirmation keys or codes for each transaction carried out with the IRS or the financial institutions; and digital signature and certificate information. It is further contemplated that trust account administration server 22 will generally limit access to these various trust account entries, based on the role (e.g., trustee, or beneficiary) of the party seeking such access.

In process 72, trust account administration server 22 creates a default set of home pages for the parties to the trust, including for the nominated trustee, the beneficiary, and the family of the beneficiary. These default home pages provide a portal to those persons as they begin to access information regarding the trust over the Internet.

In processes 74, 76, trust account administration server 22 notifies the beneficiary (and guardian) and nominated trustee, respectively, of the existence of the trust that was newly created by the grantor. In process 74, trust account administration server 22 sends an electronic "welcome kit" to the beneficiary and the beneficiary's guardians, by way of an email that is either contains the welcome information in its body, or instructs the beneficiary and guardian to access the beneficiary and family home pages created in process 72. In addition, it is contemplated that the email "welcome kit" will include a generated username and password combination for the beneficiary and guardians, by way of which the home pages and details of the new trust can be examined. Similarly, in process 76, trust account administration server 22 forwards an email "welcome kit" to the nominated trustee, including a username and password combination by way of which the trustee can access the trust (e.g., through the trustee home page created in process 72) and begin its management, as will be described in further detail below. For security, the username and password combinations may be forwarded in an encrypted manner, for example in a self-decrypting file having a passphrase that the grantor provides offline to the trustee and beneficiary.

In the case of the beneficiary, it perhaps is not essential that the beneficiary immediately respond to the welcome kit issued in process 74. In the case of the trustee, however, it is important that the nominated trustee acknowledge the existence of the trust and accept the trustee responsibilities, or else the trust administrator must contact the successor trustee (or grantor, in the worst case), to pass along the responsibilities. Accordingly, in response to the issuance of the trustee welcome notification in process 76, trust account administration server 22 undertakes decision 77, by way of which the trustee acceptance process is advanced. If the trustee declines the trust responsibilities or fails to accept them within a given time period (decision 77 is NO), process 76 is repeated by trust account administration server 22 issuing the email "welcome kit" to the successor trustee identified by the grantor. Failing acceptance by the successor trustee (decision 77 is again NO), trust account administration server 22 either appoints a default trustee or contacts the grantor to receive additional nominations for the responsibility. On the other hand, upon one of the nominated trustees accepting the role (decision 77 is YES), this initial bookkeeping by trust account administration server 22 is complete for the time being, awaiting inputs from the trustee regarding the management of the trust.

The process of communication between the trustee and the trust administrator, by way of which the trustee accepts the role of trustee for the new trust and begins management of the assets of the trust, will now be described. As noted above, trust account administration server 22 sends an email to the nominated trustee to advise that person that they have been nominated as the trustee. Preferably, the email includes a hyperlink by way of which the trustee may initiate process 34a. Process 34a refers to the process of the nominated trustee accepting the trustee responsibility, and beginning to manage the trust, as will now be described relative to FIG. 6.

Process 34a is carried out by trustee computer 25, in response to inputs from the nominated trustee, in combination with trust account administration server 22, via the Internet as shown in FIG. 2. As shown in FIG. 6 and as noted above, process 34a begins with the nominated trustee following hyperlink 32a. The nominated trustee is first asked by trust account administration server 22 to enter a username and password; preferably, the initial username and password is communicated to the nominated trustee by way of the welcoming email. It is preferred that some amount of security be provided in the communication of this important access information. For example, the username and password may be encrypted when sent to the trustee, or may consist of information known only by the trustee (e.g., numerical birthday plus last name, etc.), or may be a secret username and password that the grantor communicates offline to the trustee.

Assuming that the username and password entered by the nominating trustee matches that assigned in the establishment of the trust and that was stored in trust account database 24 (if not, of course, process 34*a* terminates), the nominated trustee then is asked by trust account administration server 22 to accept or decline the responsibility of serving as trustee, in decision 79. This consent also may include consent to establish an account for the trust with the trust administrator, and consent to have the trust administrator effect state and federal tax filings and the like. Either in the welcome kit or at this point in process 34*a* (or both), the trustee is advised of the responsibilities and duties of serving, and the fees charged by the trust administrator against the trust, to ensure that his or her consent is informed. If the trustee chooses to not accept these responsibilities (decision 79 is NO), trust account administration server 22 issues an email notification to the grantors, and contacts any named successor trustee with a trustee welcome kit (as in process 76 of FIG. 5), in process 80. The declining nominated trustee then is logged out of process 34*a*.

It is contemplated that the acceptance of the trust responsibilities will be effected in a similar manner as the acceptance by the grantor of the trust terms. As noted above, this acceptance may be made by digital signature, or by some other unequivocal act on the part of the accepting trustee. Upon the nominated trustee accepting the role of trustee for the new trust (decision 79 is YES), control passes to process 82 in which the identifying information of the accepting trustee is updated by the accepting trustee, and verified against public and private databases to ensure that the accepting trustee is an actual person, and meets any creditworthiness requirements established by the trust administrator for this role. Any consents necessary for this credit and identity check are obtained from the accepting trustee at this point. Following a successful identity check in process 82, trust account administration server 22 confirms, in decision 84, that the accepting trustee is of the proper age (and legal capacity) to serve as a trustee; if not (decision 84 is NO), the grantor is notified and any successor trustee is contacted, in process 80.

Upon the accepting trustee meeting the age and capacity requirements (decision 84 is YES), the accepting trustee then becomes the actual trustee of the new trust. In process 86, the trustee is then able to confirm the current password, or change the password to a new password for security purposes; any new password is then stored in trust account database 24 by trust account administration server 22. Trust account administration server 22 then forwards the trust instrument to the trustee, electronically, by mail, or both, in process 88.

As noted above, under current tax law, some trusts are required to file federal income tax returns. Accordingly, non-grantor trusts and, sometimes, grantor trusts are required to file certain forms with the Internal Revenue Service, and obtain a tax identification number (commonly referred to as an Employer Identification Number, or EIN, which is analogous to a Social Security Number for individuals). According to the preferred embodiment of the invention, the filing of Form SS-4 and the obtaining of an EIN may be performed by the trustee online, in the same interactive session as the acceptance of trustee responsibilities, in process 90. FIG. 7 illustrates process 90 in more detail, as will now be described.

Figure 8:
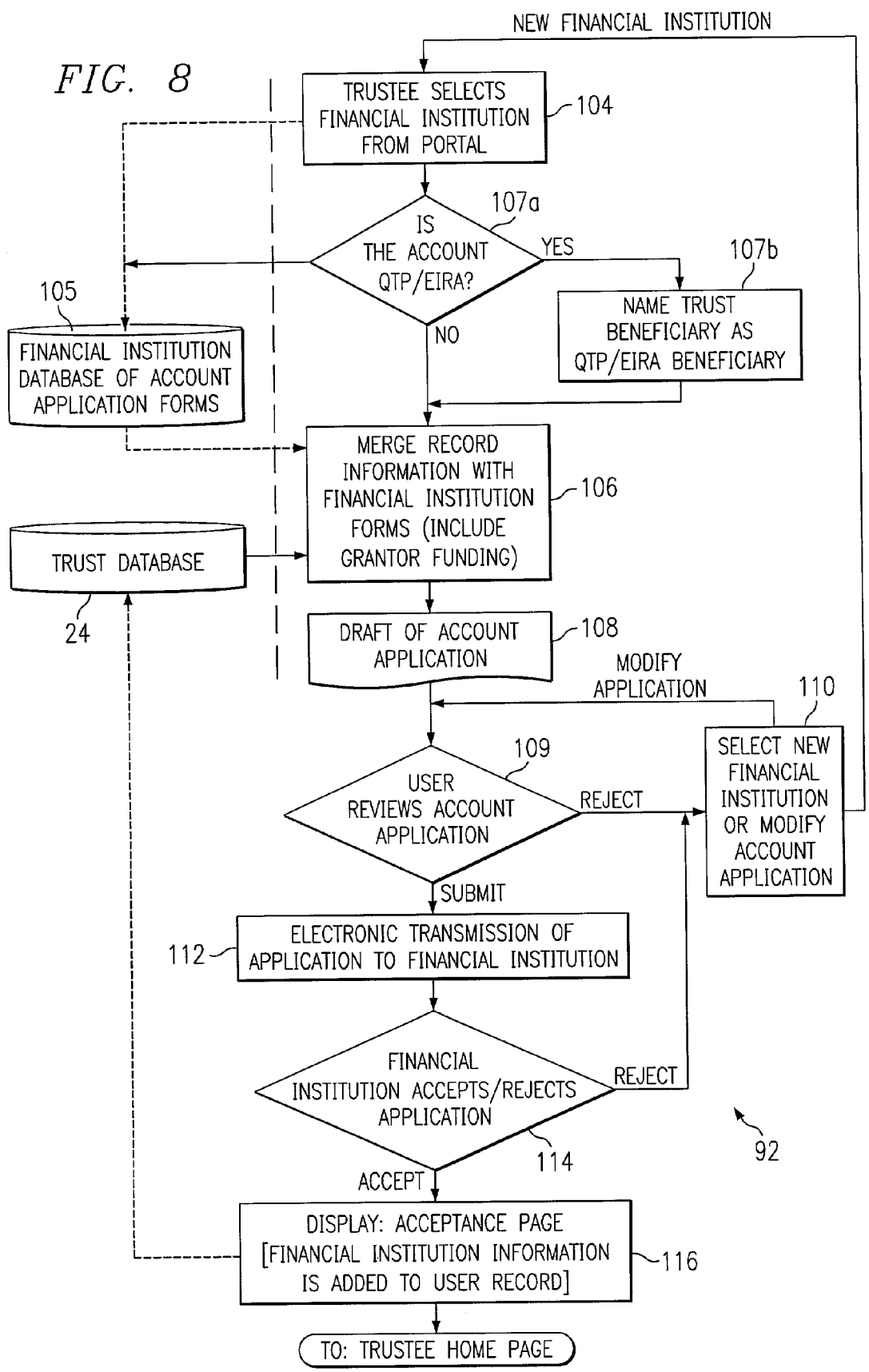

Process 90 begins with process 94, in which trust account administration server 22, in response to inputs from trustee computer 25, merges current information associated with the new trust and stored in trust account database 24 with current versions of Internal Revenue Service (IRS) forms, such as Form SS-4, which is an application for an EIN. In process 96, trust account administration server 22 prepares a draft Form SS-4 for the new trust, and forwards it electronically to trustee computer 25 for review by the trustee. In decision 97, the trustee determines whether to accept or reject the draft Form SS-4; if rejected (decision 97 is NO), the trustee edits the entries in the working copy of Form SS-4 in process 98 (some entries relating to the grantor and beneficiary not being editable by the trustee), following which the trustee again receives a draft Form SS-4 (process 96) for review (decision 97). Upon acceptance of the completed Form SS-4 (decision 97 is YES), the trustee decides whether to file the Form SS-4 electronically with the IRS. If so (decision 99 is YES), the appropriate digital signature of the trustee may be applied to the electronic Form SS-4, and trust account administration server 22 electronically forwards the completed and signed Form SS-4 to the IRS in process 100, for example over the Internet by a communication from trust account administration server 22 to taxing authority server 27 (FIG. 2). It is contemplated that, at some time in the future, the IRS will provide EINs over the Internet to the general public (pilot programs for online EIN application and grant having already been done by the IRS), in which case process 100 would also include the storage of the assigned EIN in trust account database 24, and its communication to the trustee. Alternatively, the trust administrator may have received a block of EINs from the IRS in advance; in this case, process 100 may be carried out by the trustee accepting the completed Form SS-4 in decision 97, and trust account administration server 22 then assigning an EIN to the trust from its previously-assigned block of EINs. If electronic filing is not available, or if the trustee chooses instead to file a paper version of Form SS-4 (decision 99 is NO), process 102 is carried out by trust account administration server 22 forwarding an electronic copy of the completed Form SS-4 to the trustee over the Internet; the trustee can then sign a printed copy of the form and mail it to the IRS in the conventional manner. Following the electronic or physical filing of Form SS-4, and of course any other similar forms required by taxing or other government authorities in the establishing of a trust, process 92 is then carried out by the trustee as shown in FIG. 6. In process 92, the trustee establishes a primary account with a financial institution, by way of which the trustee can begin to manage the trust assets. Attention is directed to FIG. 8, in which process 92 is described in further detail.

Process 92 begins with process 104 in which the trustee selects a financial institution to serve as a primary financial institution within which the trust will be administered. It is contemplated that the trust administrator may have previously arranged with one or more financial institutions that have agreed to serve in this capacity. For purposes of marketing and visibility, these financial institutions may have a presence on the trustee home page, so that the trustee can readily select the desired primary financial institution, in process 104, by way of a hyperlink or click-through advertisement. Alternatively, the trust administrator may have entered into an exclusive arrangement with one financial institution that will be maintaining all trusts administered by the trust administrator.

Following selection or confirmation of the primary financial institution in process 104, trust administrator server 22 queries the trustee, in decision 107*a*, to determine whether either a QTP or an EIRA account is being established. If so (decision 107*a* is YES), the trustee expressly names the beneficiary of the trust as the beneficiary of the QTP or EIRA, as the case may be, in process 107*b*. In either case (decision 107a is NO or process 107b is performed), trust administration server 22 then communicates with database 105 at the financial institution to receive the appropriate account application form for the trust. These forms are merged by trust administration server, in process 106, with current records for the trust that are stored in trust account database 24, creating a draft of the account application that is electronically forwarded to the trustee in process 108.

In decision 109, the trustee reviews the draft account application, preferably in an interactive online session via trustee computer 25, and determines whether the terms of the account meet with his or her judgment, whether the application is correct, and whether additional information required by the financial institution is required. If not (decision 109 is REJECT), the trustee either chooses to select a new financial institution in process 110, following which the process begins again with process 104, or simply modifies the application in process 110 to correct or provide the additional information, and reviews it again in decision 109. Upon the trustee approving and agreeing to the terms of the account (decision 109 is SUBMIT), the trustee then carries out process 112 to sign and submit the account application to the financial institution. In process 112, the trustee may, as in the case of accepting trustee duties, utilize a digital signature to execute the application; in addition, it is contemplated that part of the application process will include the trustee certifying the trust, in the account application with the financial institution.

In decision 114, the financial institution reviews the account application to determine whether it wishes to serve as the primary account for the trust. If not (decision 114 is REJECTS, the trustee is notified, preferably during the same online session or alternatively by way of email, and then either selects a new financial institution or modifies the application, in process 110. Upon acceptance of the account by the financial institution (decision 114 is ACCEPT), the financial institution communicates acceptance either to trustee computer 25 or to trust account administration server 22 or both, in process 116. Trust account administration server 22 will then link the trust records in trust account database 24 to the accepting financial institution, and initiate the forwarding of funds to the new account in that institution. The trustee, upon receiving the acceptance of the account by the financial institution, will then be forwarded to the trustee home page, where he or she can logout (see FIG. 6), or carry out other trustee actions, including the establishing of one or more secondary accounts, as will be described below.

As noted above relative to FIG. 5, trust account administration server 22 also established a home page for the beneficiary and the beneficiary's family (process 72), and forwarded a "welcome kit" notification to the beneficiary and possibly the beneficiary's guardian. According to the preferred embodiment of the invention, the beneficiary and guardian (collectively referred to as the beneficiary, for purposes of this description) are able to carry out initialization and customization of their access and actions relative to the trust, by way of access to the Internet from beneficiary computer 26, as will now be described relative to FIG. 9. As in the case of the trustee, the welcoming email to the beneficiary preferably includes a hyperlink by way of which the beneficiary may initiate process 34c. The following description, and its particular processes, are contemplated to be carried out by beneficiary computer 26 in combination with trust account administration server 22 and trust account database 24, as in the case of trustee access.

Figure 9:
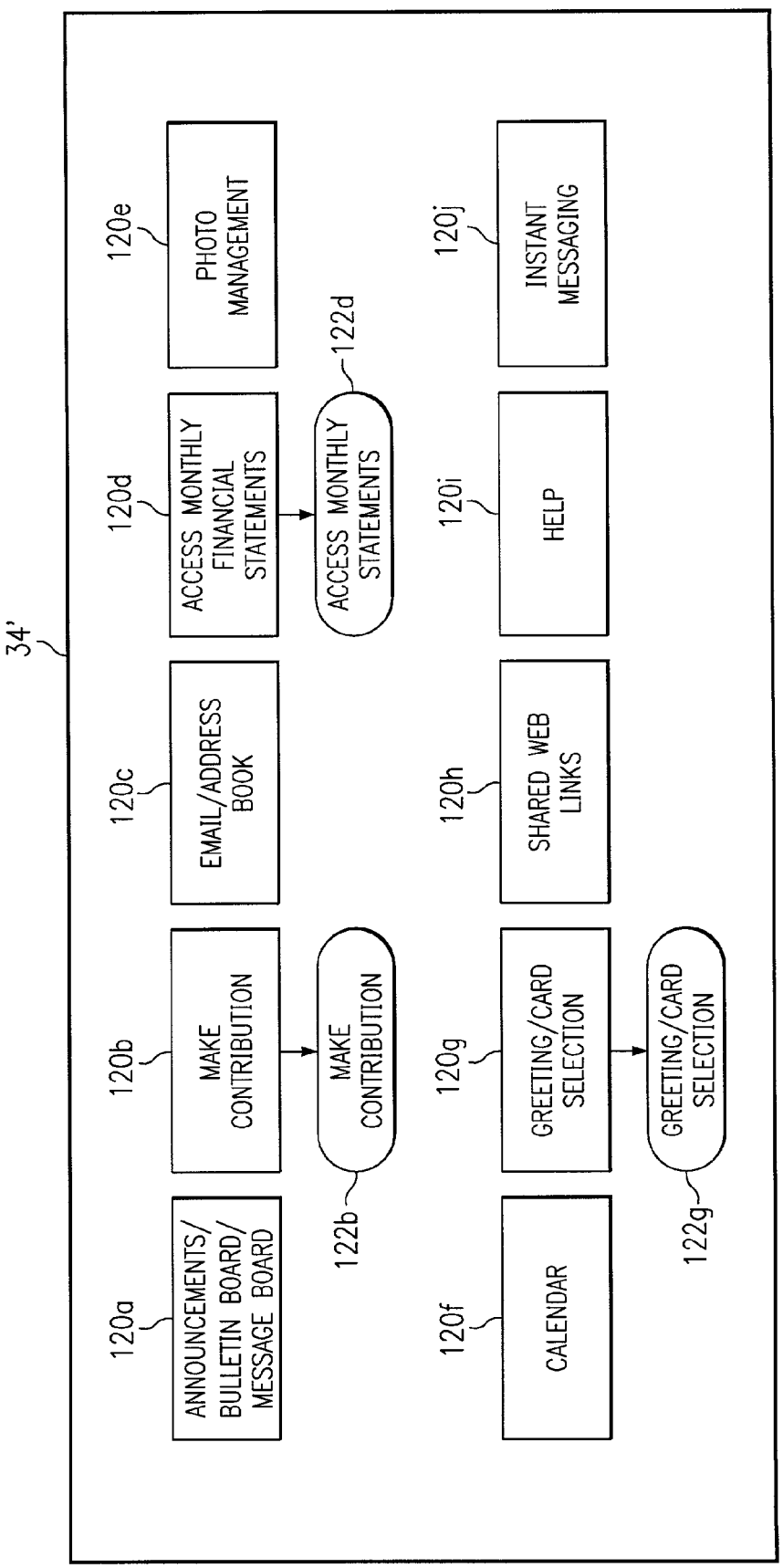
FIG. 9 is a graphic illustration of a family (trustee or beneficiary) home page, for use according to the preferred embodiment of the invention.

FIG. 9 illustrates family home page 34', which is called by the beneficiary selecting the communicated hyperlink, or hyperlink 32c at home page 30. As evident from FIG. 9, several hyperlinks 120 useful for the beneficiary or his or her family are included within family home page 34'. More than one beneficiary of more than one trust may share a family home page 34', but each trust corresponding to each beneficiary, and the contributions thereto, will be segregated by trust account administration server 22. In the first visit by the beneficiary to family home page 34' can establish his or her modifications to the page. Alternatively, a wizard or dialogue may be enabled by the beneficiary selecting the communicated hyperlink in the email. In any case, process 34c for this first instance will now be described in detail, with reference to FIG. 10.

Process 34c begins with process 126, which the beneficiary first encounters from hyperlink 32c in the first instance. In process 126, the beneficiary is first asked by trust account administration server 22 to enter a username and password; the initial username and password will have been communicated to the nominated trustee, for example in an encrypted manner by way of the welcoming email, or by referring to facts that are generally known only by the beneficiary, or communicated offline to the beneficiary by the grantor. Assuming that the username and password entered by the beneficiary matches that assigned in the establishment of the trust and that was stored in trust account database 24 (if not, of course, process 34c terminates), control passes to process 128 in which the beneficiary updates his or her identifying information as stored in trust account database 24 based on the grantor's inputs, and grants any necessary consents for verification to the trust administrator; trust account administration server 22 then verifies the beneficiary's identity against public and private databases to ensure that the beneficiary is an actual person. Digital signatures may also be established, on the part of the beneficiary, as part of this process 128. Following a successful identity check in process 128, the beneficiary is permitted to change the password, or confirm the originally assigned password, in process 130.

If a guardian is serving on behalf of the beneficiary in process 34c, it is contemplated that similar processes of login, verification of identity, and password maintenance as processes 126, 128, 130 will be executed by the guardian and the trust administrator. In connection with the verification of the identity of the guardian, trust account administration server 22 can also confirm that the guardian as identified is of legal age and capacity to serve as guardian, and that the guardian is willing to undertake those responsibilities in connection with this trust.

In process 132, the beneficiary or guardian is notified of any rights to presently receive the gifts from the grantor or contributors, depending upon the structure and purpose of the trust. As known in the art, so-called "Crummy" or demand right trusts are those trusts which can allow the beneficiary an unlimited right to each gift contributed to the trust, for a limited period of time; under current tax law, this demand right causes the gift to be a present interest under IRC §2503, qualifying the gift for the tax exemption under IRC §2503(b). If the trust has been established as a Crummy trust, process 132 will notify the beneficiary or guardian at the appropriate time, which may be upon creation of the trust, of this right. Decision 133 is then performed by trust account administration server 22 to determine whether the beneficiary or guardian has exercised this right, in which case (decision 133 is YES), process 134 is performed to distribute the assets and terminate the trust. Process 134 will be described in further detail below.

If the right of withdrawal is not exercised (decision 133 is NO), process 136 may now be carried out by the beneficiary or guardian, if desired. In process 136, the beneficiary or guardian can establish one or more accounts with financial institutions to receive any distributions of funds that are permitted under the trust and effected by the trustee. Process 136 will likely follow the steps described above relative to FIG. 8 in connection with setting of the trust account in process 92. Of course, if no distributions are expected for some time, process 136 may be skipped by the beneficiary or guardian at this point.

In process 138, the beneficiary or guardian can perform other editing of family home page 34'. It is contemplated that only the beneficiary or guardian can edit or modify the family home page 34', which is under username and password control. Referring back to FIG. 9, the beneficiary can make announcements that are linked to hyperlink 120*a*, and set up an email address book that is linked to hyperlink 120*c*. It is also contemplated that family home page 34' may be used for purposes other than simply monitoring and contributing to the trust, particularly if such purposes improve traffic to the family home page. For example, family pictures may be made viewable via hyperlink 120*e*, so that family members and interested friends may keep up with the growth of the beneficiary and his or her family. A calendar of birthdays and other special events may be maintained in connection with hyperlink 120*f*, as can a set of web links that the beneficiary and family find interesting, via hyperlink 120*h*. Instant messaging may be enabled by way of hyperlink 120*j*, if desired. Trust account administration server 22 may maintain a help page, linked to hyperlink 120*i*, as well. Processes that are enabled by other hyperlinks for making contributions (120*b*), accessing financial statements (120*d*), and greeting card selection (120*g*), will be described in further detail below. Following the desired editing of family home page 34' by the beneficiary or guardian, in process 136, the beneficiary or guardian is returned to family home page 34' for additional activity, or for logout as desired. This family home page 34' can now be accessed via hyperlink 32*c* of home page 30, either by the beneficiary or guardian, or by another interested party.

This process 34*c*, by way of which the beneficiary or guardian can edit family home page 34', is not only performed initially upon creation of the trust, but at any time during the life of the trust as administered through trust account administration server 22. As such, it is contemplated that the beneficiary will often repeat process 34*c* to manage the way in which contributors can access information about the family, or about the trust.

Referring back to FIG. 1, once the trust has been established and process 10 completed, the trust assets may now be managed by the trustee in process 12. According to the preferred embodiment of the invention, this trust management is carried out by the trustee, via trustee computer 25, accessing the trustee home page via hyperlink 32*a*.

FIG. 11 illustrates the operation of trust maintenance by the trustee, by way of process 12. The trustee enters a trustee home page (not shown) from hyperlink 32*a* of home page 30, via process 34*a*. As shown in FIG. 11, process 12 begins with process 140, in which the trustee logs in with the previously defined username and password. Of course, if the username and password are determined by trust account administration server 22 to not match that previously stored, process 12 terminates. Assuming a valid login, several management choices are made available to the trustee, as will now be described.

It is contemplated that the trustee may wish to maintain more than one financial institution account for the trust, for example if different investment goals are available from different institutions. According to this embodiment of the invention, the trustee can set up a QTP or an EIRA within the trust, into which the trustee can transfer either general assets of the trust within the trustee's general discretion and authority, or contributions that are specifically earmarked by the donor for application to a QTP or EIRA. In process 142, the trustee may create a new account, in cooperation with trust account administration server 22 linking to the computers 28 (FIG. 2) of one or more financial institutions. It is contemplated that the establishing of an account with another institution will follow a similar procedure as discussed above relative to process 92, including the selection of an available institution with whom the trust administrator has a pre-existing relationship, the linking of trust database records with the account application process, and acceptance by way of a digital signature.

Once multiple financial institution or brokerage accounts have been established, it is useful, as noted above, to have one such account identified as the primary account and others as the secondary account. In this way, funds that are not otherwise earmarked can reside in the primary account until transferred by the trustee. Accordingly, process 92 described above established the primary account, while process 142 in process 12 instituted a new, secondary, account. Accordingly, in process 144 of process 12, the trustee can manage the status of the primary account, including closing the account, updating, the account information, or "demoting" the once-primary account to a secondary status. Conversely, in process 146, the trustee can close or update a secondary account, or "promote" a secondary account to primary status. It is contemplated that processes 144, 146 are preferably effected and authorized using the digital signature of the trustee, for purposes of security and assurance of authority.

According to the preferred embodiment of the invention, the trustee is able to effect investment decisions and control over the trust assets by moving assets from one account to another among financial institutions, and also by moving funds from account to account within the same financial institution. It is contemplated that the trustee's authority to effect investment decisions and control over the trust assets, under the trust instrument, extends to the ability to create and fund tax-advantaged educational accounts such as QTPs and EIRAs. These tasks are performed by the trustee by way of process 148, in which the trustee authorizes the transfer of funds among the various established accounts by communicating the desired transfer within an online session with trust account administration server 22, and authenticating the transfer by way of a digital signature or other authorization. In the case of distributions from a QTP or EIRA account within the trust, process 148 preferably includes the ability to query the trustee as to application of the distribution to qualified educational expenses; in addition, trust account administration server 22 also preferably determines whether any tax liability on the part of the beneficiary or grantor is incurred as a result of the distribution. In addition, the trustee can distribute some of the assets of the trust to the beneficiary in process 148, by requesting a transfer from one of the trust accounts to an account held by the beneficiary, assuming that such a distribution is permitted by the terms of the trust. Following the request of process 148, trust account administration server 22 can effect a clearing house function among the various financial institutions with whom the trust administrator has a relationship, for example at the end of each business or trading day, to give effect to the requested transfer by this trustee and trustees of other trusts. In the event that a problem or other reason exists that prevents the desired transfer, trust account administration server 22 notifies the trustee of that event in the current online session, or alternatively by email or other means.

Additionally, the trustee can perform process 152 by way of which he or she can change contact information regarding himself or herself, or alternatively can resign as trustee. In the event that the current trustee resigns, process 152 can include the nomination of a successor trustee by the current trustee, if the trust provisions allow the current trustee this power; alternatively, the grantor may be notified as described above in connection with the creation of the trust, and the trustee nomination and acceptance processes will be repeated as before.

Upon completion of all current trustee business, process 12 is terminated by the trustee logging out of process 12. Referring back to FIG. 1, termination decision 13 is illustrated as part of the asset management flow. In the event that a termination event is not active (decision 13 is NO), operation of the trust continues in the normal course. Process 19, by way of which the trust is terminated and the assets distributed, will be described in detail below.

Figure 12:
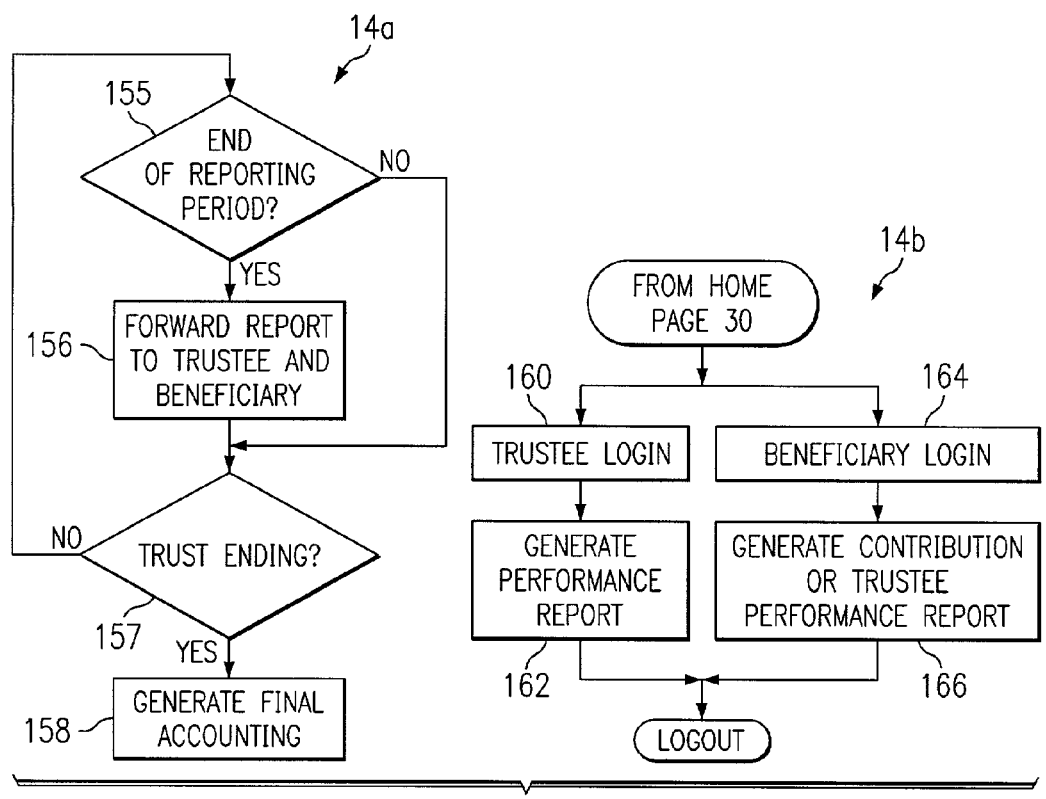
FIG. 12 is a flow chart illustrating reporting operations concerning the trust, according to the preferred embodiment of the invention.

Referring still to FIG. 1, periodic or on demand reporting of the performance of the trust is carried out by way of process 14. It is contemplated that trust account administration server 22 will be especially efficient in the generation of reports useful in the operation of the trust, both periodically and on demand of the trustee, beneficiary, and grantor. FIG. 12 illustrates the operation of process 14 in generating certain reports, as will now be described in detail.

Reporting process 14, in this preferred embodiment of the invention, includes periodic reporting process 14*a* and on-demand reporting process 14*b*, as shown in FIG. 12. In periodic reporting process 14*a*, trust account administration server 22 monitors, in decision 155, whether the conclusion of a reporting period, such as a month, quarter, or year, has been reached. If not (decision 155 is NO), control passes to termination decision 157, described below. Upon a reporting period having concluded (decision 155 is YES), trust account administration server 22 prepared the appropriate report, based on the entries stored for the trust in trust account database 24, in cooperation with the state of accounts maintained by the various financial institution computers 28 (FIG. 2), and produces the appropriate report to the trustee, and also perhaps the beneficiary, in process 156. It is contemplated that these reports may be electronically transmitted, by way of an email, or by way of a hyperlink on the trustee and beneficiary home pages, to which the trustee and beneficiary are directed by way of an email indicating that the report is now viewable.

Following process 156, and following a NO result from decision 155, trust account administration server 22 determines whether the trust is ending by way of a termination event or a request by the appropriate party under the terms of the trust. If not (decision 157 is NO), control returns to decision 155 to wait for the next reporting period to end. If the trust is ending, trust account administration server 22 generates a final accounting of the trust in process 158, which will be provided electronically or on paper to the beneficiary, guardian, and trustee, according to the terms of the trust instrument.

On-demand reporting process 14*b* refers to reports that are generated upon the request of an interested party, such as a request from either the trustee or the beneficiary made by way of the trust home page 30. On-demand reports are controlled by a login process, for security purposes. The trustee can log in, via the trustee home page in process 160, using the username and password previously established. In process 162, trustee computer 25 can then communicate with trust account administration server 22 over the Internet to request a particular report concerning the trust, for example a report of the investment performance of the trust relative to its several accounts. It is contemplated that commonly requested reports can be suggested by trust account administration server 22 by way of pull-down menus; it is also contemplated that the trustee may be able to request a specific report by way of a query-based system, in which case server 22 will generate the requested report in process 162. As shown in FIG. 12, the beneficiary can also login from beneficiary computer 26 through home page 30 or family home page 34' (FIG. 9), in process 164. Following login and establishment of an online session with trust account administration server 22, the beneficiary can request any one of several popular pre-arranged reports, view monthly statements from the individual financial institution accounts, or alternatively request a custom report. It is contemplated that the beneficiary will most often be investigating the investment performance of the accounts in the trust, investment decisions by the trustee, use of trust funds by the trustee, and the like, in such on-demand reports. In process 166, trust account administration server 22 generates the requested reports, and electronically transmits those reports to the beneficiary in the current online session, or by way of a subsequent email or website posting.

The automated reporting process 14 according to the preferred embodiment of the invention is believed to be particularly advantageous over conventional trust management systems, especially in complex trusts in connection with which multiple beneficiaries, for different purposes, are provided. Because both the legal trust information and also the asset management and investment performance information are stored in trust account database 24, trust account administration server 22 under the control of the trust administrator, can readily prepare the necessary and useful reports regarding the trust. It is further contemplated that these reports can be relatively complex, and provide accountings of the trust in compliance with standard and also new accounting principles, such as fiduciary accounting standards.

Referring again back to FIG. 1, process 16 is also carried out by the trust administrator, through the use of trust account administration server 22, to facilitate the preparation and filing of annual and quarterly tax returns and payments. As noted above, non-grantor trusts and some portions of grantor trusts may be taxable entities, and as such may be required, under current law, to file tax returns and possibly make tax payments. Following the establishment and storing of the EIN through the online application process 90 described above, trust account database 24 already contains sufficient legal and financial information (including Forms 1099 that are either electronically or physically communicated from each financial institution to the trust administrator) to readily prepare any particular tax return with great efficiency. It is therefore contemplated that the present invention enables the trust administrator to offer low-cost tax preparation and filing services on behalf of the trust, making the trust administration through this system and method particularly attractive for even modestly-funded trusts.

Figure 13:
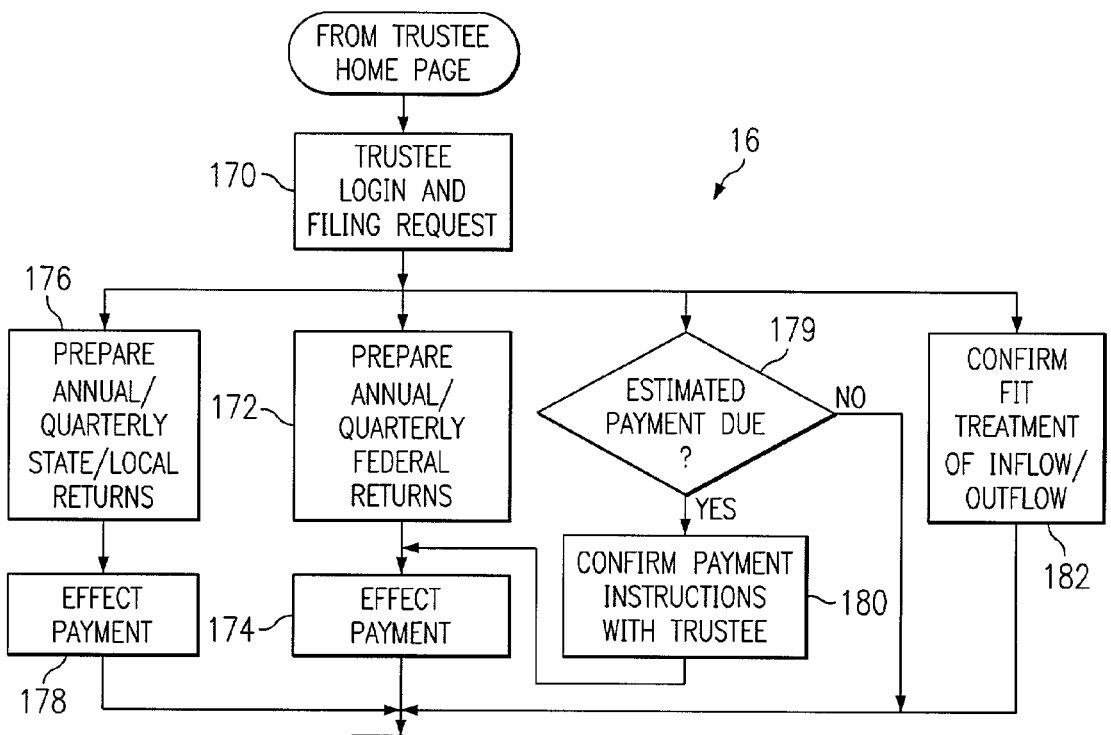
FIG. 13 is a flow chart illustrating a tax filing and payment method implemented by the system according to the preferred embodiment of the invention.

FIG. 13 illustrates, in detail, automated tax filing and payment process 16 according to the preferred embodiment of the invention. As illustrated in FIG. 13, tax management of the trust is the ultimate responsibility of the trustee, and as such, according to this implementation, the trustee logs in by way of his or her username and password, and requests the trust administrator's services in preparation of the tax returns, in process 170. It is contemplated that the trust administrator will advise the trustee of the tax return preparation and filing fees to be charged against the trust at this time, and that the request for such services by the trustee will be authenticated by way of a digital signature.

Following trustee login and request process 170, trust account administration server 22 can then be operated to prepare the appropriate tax filings, in process 172 for federal returns, and in process 176 for state and local tax returns, if applicable. As noted above, trust account database 24, in cooperation with financial institution computer 28 for those institutions with whom the trust maintain investment accounts, either stores or has access to all legal and financial information necessary to rapidly prepare annual and quarterly tax returns on behalf of the trust. Input from the trustee may be required to confirm the tax treatment of certain inflows or outflows of funds or tax items. Following the preparation of the returns in processes 172, 176, and their review by the trustee (preferably electronically by way of email or website posting) and approval (preferably by way of digital signature), trust account administration server 22 effects the federal and state/local tax payments in processes 174, 178, respectively. It is contemplated that the trust administrator can make this payment, from the assets of the trust, by electronic funds transfer, for example by way of a clearing house type of transaction or by a direct transfer of funds.

Once annual tax returns are filed, quarterly estimated tax payments are required in some taxing jurisdictions. With reference to process 16 of FIG. 13, trust account administration server 22 carries out decision 179 to determine whether an estimated tax payment is due and, if so, the amount. If not (decision 179 is NO), no further action in this regard is required. Upon an estimated tax payment coming due, however (decision 179 is YES), trust account administration server 22 carries out process 180, by way of which an email or other communication is made with the trustee over the Internet to advise the trustee of the upcoming payment, and to secure authorization for such payment from the trust, preferably by way of digital signature as noted above. Upon receiving such authorization, control then passes to the appropriate one or both of payment processes 174, 178, by way of which payment of the estimated tax is made from the assets of the trust.

At a point in time in which distributions are being made from the trust assets to the beneficiary, additional tax considerations may come into play. Referring still to FIG. 13, trust account administration server 22, under the guidance of the trust administrator and on request or authorization of the trustee, can produce a report of the various inflow and outflow transactions during the tax period, and suggest a tax treatment for each such transaction. For example, some distributions to the beneficiary can be noted, and communicated to the beneficiary (and possibly confirmed by either the trustee or the beneficiary, again by way of digital signature to that effect), so that the proper tax filing on the part of the beneficiary can be effected.

The ability of the trust administration method and system according to the preferred embodiment of the invention is contemplated to provide a low-cost way to ensure that the proper tax returns and payments are made. This automated and intelligent approach enables the use of this system and method for even modest trusts, because the administrative costs are kept low through the automated processes of this invention. In addition, it is contemplated that the automation provided by this embodiment of the invention will permit individuals to serve as trustee for their minor children and relatives, without the fear of being overwhelmed by the effort and complexity of trust management.

As shown in FIG. 1, according to the preferred embodiment of the invention, contributions from parties other than the grantor can be solicited, received, invested, and acknowledged during the life of the trust, in process 18. This ability to add additional assets to the trust, even in small amounts from a relatively large number of donors, is contemplated to be especially attractive to the small educational, support, or other type of trust. This ability allows the initial funding of the trust to be modest, while still providing the potential to provide a sizable fund over the years.

FIG. 14 illustrates contribution process 18 in more detail. As shown in FIG. 14, any one of a number of processes 184, 186, 188 can be used to solicit contributions from family members and friends. In process 184, the beneficiary or guardian solicits contributions from family members by way of email. For example, it is contemplated that email announcements of gift-giving events such as birthdays, graduations, religious events and milestones, and the like may be made in process 184. Many family members and friends may be happy to contribute to an educational or other trust for the benefit of a minor child, as opposed to buying conventional gifts, because the donor will have confidence not only that the gift will grow over time, but indeed that the gift will prove useful. Accordingly, it is contemplated that the email solicitations of process 184 will often be welcomed by the donors, and will often result in contributions.

Process 186 provides another approach by way of which solicitations may be made on behalf of the trust. Referring to FIG. 9, for example, family home page 34' includes such functions as announcement hyperlink 120*a*, by way of which upcoming events concerning the beneficiary can be announced, photo management hyperlink 120*e* by way of which current pictures of the beneficiary and his or her family may be viewed, and calendar hyperlink 120*f* by way of which visitors to family home page 34' can stay abreast of upcoming birthdays and events. In process 186, the prospective contributor visits family home page 34' in order to keep up with family or friend news, and is enticed to follow hyperlink 120*b* to make a contribution to the trust.

Finally, process 188 illustrates a method by way of which the prospective donor unilaterally investigates whether an online trust such as that described herein has been established for a particular beneficiary or family, so that if such a trust exists the donor can contribute. It is therefore contemplated that trust account administration server 22 can include a search engine, or is accessible through an existing general purpose search engine, so that prospective donors can search by name of the individual or trust name, and find the corresponding home page 30 or family home page 34' or the like and make donations.

By way of any of processes 184, 186, 188, or by an alternative approach, process 18 continues with the contributor entering home page 30 (or family home page 34', as the case may be) via the Internet from contributor computer 29, and selecting donation hyperlink 32*f*, in process 190. This selection initiates donation process 34*f*, by trust account administration server 22 sending the appropriate web page or online form to the contributor. The contributor reviews the selections, in process 192, and makes a contribution by selecting the amount of the gift, selecting a payment system vendor (e.g., credit card, EFT, ECHECK or PAYPAL payment services, or the like), and authorizing payment from the contributor's account through the selected payment system. It is contemplated that authorization of the charge will be made by digital signature, or some other unequivocal affirmative act on the part of the contributor. In process 194, trust account administration server 22 interrogates trust database 22 in connection with the current trust, to determine the number and amounts of previous gifts made by this contributor (or spouse) to this trust, to determine whether the current gift will invoke any tax consequences that may affect the contributor.

If so, trust account administration server 22 notifies the contributor of this event and its tax ramifications, permitting the contributor to reconsider, restructure, or reconfirm the new gift to the trust. If the contributor wishes to make a gift despite the tax liability, for example a gift in excess of the gift tax exemption, trust account administrator server 22 can issue a message that invites the contributor to use the services of the trust administrator in preparing the necessary gift tax returns and filings on behalf of the contributor. Donation process 34*f*, and the contributor's direct involvement, then ends.

Upon receiving the inputs from the contributor regarding the new gift, trust account administration server 22 can provide the beneficiary with a notice of the new gift and, if applicable, any right of withdrawal that is provided by the trust instrument (for example, in a Crummy trust). Trust account administration server 22 then performs process 202, prompting the beneficiary to issue thank-you electronic greeting cards, or some other acknowledgement of the gift. In this regard, the beneficiary may visit family home page 34' (FIG. 9) and select an appropriate greeting card for the thank-you note, via hyperlink 120*g* and process 122*g*. In addition, a hyperlink in the email notice to the beneficiary may also be provided, by way of which the beneficiary is directed to the thank-you card section of family home page 34'. Alternatively, trust account administration server 22 or beneficiary computer 26 may, in the event of a gift, simply forward an automatic acknowledgement to the donor by email, although such an acknowledgement is of course less personal in nature.

Regarding the demand right notice of process 196, decision 197 is then performed by trust account administration server 22 in combination with beneficiary computer 26, to determine whether the beneficiary has exercised any right of withdrawal that exists under the trust. If the beneficiary exercises such right (decision 197 is YES), the funds are distributed in process 198. If the demand right is not exercised (decision 197 is NO), decision 199 is then performed to determine whether the contribution is earmarked for application to a QTP or an EIRA. As noted above, it is contemplated that contributions to the trust, and specifically to a QTP or an EIRA in the trust, may arrive in the form automatic rebates from sellers of goods and services; these contributions will be earmarked for application to their corresponding QTP or EIRA. If decision 199 is YES for the contribution, the contribution is applied to the specified QTP or EIRA account, in process 202. Alternatively, if the contribution is earmarked for application to a QTP or an EIRA and if the beneficiary has exercised his demand right relative to the contribution, trust account administration server 22, under previous direction by the trustee by way of a preference or other instruction, can satisfy both requirements by applying the contribution to the QTP or EIRA and by distributing an amount equal to the contribution, to the beneficiary, from the primary account. Returning back to decision 199, if the contribution is not earmarked for QTP or EIRA application, (decision 199 is NO), the contribution is applied as cash to the primary account by trust account administration server 22, in process 200. It is contemplated that process 200 can be carried out in the conventional manner, for example by way of communication between trust account administration server 22 and payment system computer 23, or via a clearing house arrangement as described above. In either case, trust account administration server 22 notifies the trustee of the gift, in process 204, so that the trustee may use the opportunity of additional cash in the trust to make another investment or add to an existing investment.

As discussed above, this automation of the solicitation, receipt, and acknowledgement of gifts to the trust is believed to reduce the cost of managing a growing trust, and thus make it more attractive for family and friends to establish and maintain a modest trust that has the potential of significant growth over time.

As shown in FIG. 1, it is contemplated that at some point the trust will end, as indicated by decision 13 returning a YES result, passing control to termination process 19. Termination process 19 will now be described in further detail, relative to FIG. 15. As shown in FIG. 15, upon the terminating event being reached, for example by the beneficiary reaching a specified age, or upon a special event (marriage or death of the beneficiary), decision 211 returns a YES result. Process 212 is then performed, by way of which trust administration server issues a notice of termination of the trust to the beneficiary, for example by way of a secure email or Internet access with a digital signature. In response, the beneficiary (or the trustee, in extraordinary events, or where directed by the trust instrument) selects the form in which the assets are to be distributed.

According to the present invention, several types of distributions are contemplated. If the beneficiary elects to receive simply a cash payout of the trust assets, trust account administration server 22 performs process 216*a*, by simply effecting an electronic funds transfer (EFT) to a financial institution account selected by the beneficiary. In process 216*b*, trust account administration server 22 transfers the assets in kind to a specified account of the beneficiary, if the beneficiary elected to receive the trust assets in kind.

It is also contemplated that, in lieu of termination and distribution, the beneficiary can elect to have the trust or its assets merged into a different trust that is also managed by the trust administrator, via trust account administration server 22.

In any event, upon the distribution of the trust assets, the trust administrator, using trust account administration server 22 and trust account database 24, generates a final accounting of the trust, by way of decision 157 and process 158 in process 14 (FIG. 12), and forwards this accounting to the trustee and beneficiary, in process 218. It is of course contemplated that this accounting may be transmitted by secure or encrypted email; alternatively a paper accounting may also or instead be generated and distributed. An accounting for a court of competent jurisdiction may also generated in process 218, if desired by the trustee.

Following the generation of the final accounting in process 216, the trust account is closed by trust account administration server 22, in process 220. The trust has then served its stated purpose upon creation, and preferably at a relatively low cost and low level of administrative tasks being carried out by laypersons.

As discussed above, the present invention provides important advantages in the establishing and managing trusts for the benefit of minor children. Fundamentally, the automation provided by the trust administration system over the Internet provides the potential to greatly reduce creation and maintenance fees for trusts. The use of a trust for these assets provides the additional benefits of tax avoidance, protection of assets from beneficiary and grantor creditors, and protection of assets from immature decisions of the beneficiary. Modest trusts can therefore now be established, with the ability to contribute small amounts making the automated trust more popular, especially concerning educational and support trusts for the benefit of minors.

In addition, as noted above, the present invention provides for the management of various types of accounts within the trust vehicle. These account types can include QTP and EIRA accounts, to which contributions may be made by friends or family of the beneficiary, or by third parties such as made by way of automatic rebates. FIG. 16 schematically illustrates trust T, which may be a "Crummy"-type trust, a §2503(c)-type trust, or any other type of trust. Within this single trust T, various accounts and investments may be managed, as shown in the Figure. For example, trust T can include mutual fund account 250, bank savings account 252, bank checking account 254, brokerage account 256 (which itself can include subaccounts for holding stocks, bonds, money market funds, and mutual funds); while single ones of accounts 250, 252, 254, 256 are shown in FIG. 16, it is of course understood that multiple ones of such accounts may reside within trust T. According to this embodiment of the invention, trust T can also participate in QTPs and EIRAs, as described above. As shown in FIG. 16, this participation is effected by way of QTP account 258 and EIRA account 260, each of which exist within trust T along with the other accounts. As discussed above, QTP account 258 will be administered by the administering state agency or educational institution; on the other hand, EIRA account 260 will be managed by the trustee, directly or indirectly, in a manner similar to an Individual Retirement Account, and as such may include subaccounts for holding stocks, bonds, money market funds, mutual funds, and other investments permitted under the applicable law. The use of the trust vehicle for educational accounts, such as QTP and EIRA accounts, can provide several important advantages, including the protection of the account assets from creditors or other claimants, separation of the account assets from consideration in educational financial aid programs, and the like. These advantages can be most advantageously used in connection with trusts that are not only managed, but also created, in the manner described above. It is also contemplated, however, that the present invention and its benefits can be realized by the placement of QTP and EIRA accounts within a previously existing "paper" trust, and then using the present invention for the receipt, application, management, distribution, and tax reporting and payment of the QTP and EIRA accounts within such a trust vehicle.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A method of creating a trust over a computer network, comprising the steps of:
   receiving, over the computer network, an electronic request to create a trust from a grantor, the request including identification information regarding the grantor, a trustee, and a beneficiary of the trust, and also an initial funding amount;
   then operating a server to forward, over the computer network, a draft trust instrument to the grantor;
   receiving, from the grantor over the computer network, authorization to electronically convey funds from the grantor to a trust account;
   after the operating step, receiving an electronic confirmation from the grantor over the computer network to establish a trust with funds in the initial funding amount;
   then storing, in a trust account database and associated with the trust account, information regarding the grantor, the beneficiary, and the conveyed funds;
   receiving a response from the trustee, over the computer network, comprising confirmation that the trustee accepts trustee responsibilities for the trust;
   electronically establishing an educational account naming the beneficiary as the beneficiary of the educational account; and
   responsive to receiving a request from the trustee, over the computer network, to transfer funds to the educational account, electronically transferring funds to the educational account.

2. The method of claim 1, wherein the computer network comprises the Internet.

3. The method of claim 1, wherein the educational account comprises a Qualified Tuition Plan.

4. The method of claim 1, wherein the educational account comprises an Educational Individual Retirement Account.

5. The method of claim 1, further comprising:
   repeatedly receiving, over the computer network, authorizations to electronically convey funds to the educational account; and
   responsive to receiving each authorization, electronically transferring funds to the educational account.

6. The method of claim 5, wherein the authorizations comprise rebates from sellers of goods and services.

7. The method of claim 1, further comprising:
   receiving a contribution request from a donor party over the computer network; and
   receiving, from the donor party over the computer network, authorization to electronically convey funds from the donor party to the trust account.

8. The method of claim 7, wherein the donor party is a person other than the trustee and other than the grantor.

9. The method of claim 1, further comprising:
   receiving, over the computer network, a request from the trustee for a distribution of assets from the educational account;
   receiving confirmation from the trustee that a purpose of the distribution is a qualified educational expense; and
   electronically transferring assets from the educational account.

10. The method of claim 9, further comprising:
    determining whether the distribution results in a tax liability.

11. The method of claim 1, further comprising:
    prior to the storing step, operating a computer to analyze the identification information to confirm the grantor's identity.

12. The method of claim 1, further comprising:
    receiving, from the grantor over the computer network, identification information regarding at least one nominated trustee;
    after the storing step, contacting the trustee over the computer network to request confirmation that the trustee accepts trustee responsibilities for the trust;
    receiving a response from the trustee, over the computer network, comprising additional identification information regarding the trustee and confirmation that the trustee accepts trustee responsibilities for the trust, operating the computer to analyze the identification information to confirm the trustee's identity; and
    then storing, in the trust account database and associated with the trust account, information regarding the trustee.

13. The method of claim 12, further comprising:
    after the operating step confirms the trustee's identity, assigning a username and password for the trustee;
    then, in response to receiving the username and password over the computer network as a login request, authorizing the trustee to manage the conveyed funds in the trust account by commands communicated over the computer network;

combining stored information associated with the trust account into a taxing authority form; and responsive to receiving an authorization from the trustee over the computer network, communicating the taxing authority form over the computer network to a taxing authority.

14. The method of claim 13, further comprising:

after the combining step, and prior to receiving the authorization from the trustee, communicating the taxing authority form to the trustee, over the computer network, for review.

\* \* \* \* \*